(12) United States Patent
Parth et al.

(10) Patent No.: US 9,468,216 B2
(45) Date of Patent: Oct. 18, 2016

(54) BAKING PAN AND PRODUCT PRODUCED THEREIN

(71) Applicant: NUBUNS, Inc., Englewood, CO (US)

(72) Inventors: Geraldine L. Parth, Englewood, CO (US); Larry W. Parr, Englewood, CO (US)

(73) Assignee: NUBUNS, INC., Englewood, CO (US)

( * ) Notice: Subject to any disclaimer, the term of this patent is extended or adjusted under 35 U.S.C. 154(b) by 0 days.

(21) Appl. No.: 14/206,200

(22) Filed: Mar. 12, 2014

(65) Prior Publication Data

US 2014/0272056 A1 Sep. 18, 2014

Related U.S. Application Data

(60) Provisional application No. 61/798,336, filed on Mar. 15, 2013.

(51) Int. Cl.
*A21B 3/13* (2006.01)
*A47J 37/01* (2006.01)
*A21D 8/06* (2006.01)
*A21D 13/00* (2006.01)

(52) U.S. Cl.
CPC ............ *A21B 3/134* (2013.01); *A21D 8/06* (2013.01); *A21D 13/0025* (2013.01); *A47J 37/01* (2013.01)

(58) Field of Classification Search
CPC ...... A21B 3/131; A21B 3/132; A21B 3/134; A21D 8/06; A21D 13/0025; A47J 37/01
USPC ............................ 220/573.4; 426/496, 497
See application file for complete search history.

(56) References Cited

U.S. PATENT DOCUMENTS

| | | | | |
|---|---|---|---|---|
| 592,058 A * | 10/1897 | Kolb | ............ | A21B 3/134 249/133 |
| 783,059 A * | 2/1905 | Miller | ............ | A21B 3/132 220/23.8 |
| 1,221,725 A * | 4/1917 | Haigh | ............ | A21B 3/134 220/23.2 |
| 2,071,845 A * | 2/1937 | Kowalski | ............ | A21B 3/134 220/553 |
| 2,078,102 A * | 4/1937 | Sicla | ............ | A21B 3/132 99/439 |
| 2,164,582 A * | 7/1939 | Gibson | ............ | A21B 3/132 220/23.2 |
| 2,255,089 A * | 9/1941 | Simonds | ............ | A21B 3/132 249/133 |
| 2,267,213 A * | 12/1941 | Newcomb | ............ | A21B 3/132 99/383 |
| 2,287,638 A * | 6/1942 | Pereira | ............ | A21B 3/132 249/118 |
| 2,507,109 A * | 5/1950 | Langel | ............ | A21B 3/134 220/23.2 |
| 2,532,109 A * | 11/1950 | Langel | ............ | A21B 3/134 220/23.2 |
| 2,601,099 A * | 6/1952 | Darnell | ............ | A21B 3/134 220/200 |
| 2,889,766 A * | 6/1959 | Hubert | ............ | A21B 3/132 249/125 |
| 3,385,205 A * | 5/1968 | McCloud | ............ | A21B 3/132 249/121 |
| 3,406,860 A * | 10/1968 | Morris | ............ | A21B 3/134 220/23.4 |
| 3,520,438 A * | 7/1970 | Apelgren | ............ | A21B 3/134 220/23.2 |
| 3,572,537 A * | 3/1971 | Baltzer | ............ | A21B 3/134 220/23.4 |
| 3,727,875 A * | 4/1973 | Downing | ............ | A21B 3/132 249/115 |
| 3,794,455 A * | 2/1974 | Heiderpriem | ............ | A21B 3/132 245/403 |
| 4,195,747 A * | 4/1980 | Hare | ............ | A21B 3/134 220/23.2 |
| 4,296,682 A * | 10/1981 | Thompson | ............ | A21B 3/135 220/23.2 |
| 4,348,949 A * | 9/1982 | Selleck | ............ | A21B 3/13 426/391 |

(Continued)

*Primary Examiner* — Alison L Hindenlang
*Assistant Examiner* — Emmanuel S Luk
(74) *Attorney, Agent, or Firm* — Sheridan Ross P.C.

(57) ABSTRACT

A baking apparatus and method of baking buns and other products is disclosed. In one embodiment, the baking apparatus includes a base pan having a plurality of cavities and a top pan having a corresponding number of molds whereby dough placed between a cavity and a corresponding mold and baked appropriately results in a bun having a flat bottom and at least on closed end.

14 Claims, 30 Drawing Sheets

(56) References Cited

U.S. PATENT DOCUMENTS

| | | | | |
|---|---|---|---|---|
| 5,191,830 | A * | 3/1993 | Jacobson | A21B 3/132 249/120 |
| 5,223,286 | A * | 6/1993 | Selbak | A21B 3/132 426/138 |
| 5,690,019 | A * | 11/1997 | Barker | A21B 3/134 249/119 |
| 6,327,968 | B1 * | 12/2001 | Scannell | A21B 3/132 426/468 |
| 6,431,059 | B1 * | 8/2002 | Castellani | A21B 3/132 220/4.22 |
| 6,505,809 | B1 * | 1/2003 | Reed | A21B 3/132 249/129 |
| D542,590 | S * | 5/2007 | Levy | D7/354 |
| 2004/0182257 | A1 * | 9/2004 | Morgan | A21B 3/132 99/426 |
| 2005/0204932 | A1 * | 9/2005 | Tingley | A21B 3/15 99/445 |
| 2005/0238773 | A1 * | 10/2005 | Stease | A21B 3/132 426/505 |
| 2007/0235627 | A1 * | 10/2007 | Leach | A21B 3/132 249/121 |
| 2009/0123625 | A1 * | 5/2009 | Shannon | A21B 3/132 426/523 |
| 2012/0003363 | A1 * | 1/2012 | Beloff | A21B 5/026 426/138 |
| 2012/0201927 | A1 * | 8/2012 | Meikle | A21B 3/134 426/62 |
| 2012/0237656 | A1 * | 9/2012 | Henry | A47J 37/01 426/512 |
| 2012/0244250 | A1 * | 9/2012 | Bartolucci | A21B 5/02 426/18 |
| 2012/0321767 | A1 * | 12/2012 | Braden | A21B 3/132 426/303 |
| 2013/0129890 | A1 * | 5/2013 | Cox | A47J 37/01 426/496 |
| 2014/0017371 | A1 * | 1/2014 | Gattineri | A47J 37/01 426/389 |
| 2014/0065273 | A1 * | 3/2014 | Krupa | A47J 37/01 426/393 |
| 2014/0116264 | A1 * | 5/2014 | Hauser | A21B 3/138 99/426 |
| 2014/0120228 | A1 * | 5/2014 | Buzzelli | A21B 3/13 426/512 |
| 2014/0127376 | A1 * | 5/2014 | Mayernick | A21D 8/06 426/549 |
| 2014/0272022 | A1 * | 9/2014 | Acampora | A21B 3/132 426/134 |
| 2015/0010685 | A1 * | 1/2015 | Hobel | A21B 3/139 426/523 |
| 2015/0250188 | A1 * | 9/2015 | Miranda Ismael Da Cruz | A21B 3/132 426/19 |

* cited by examiner

BAKING PAN AND PRODUCT PRODUCED THEREIN

CROSS REFERENCE TO RELATED APPLICATIONS

The present application claims the benefit of U.S. Provisional Application Ser. No. 61/798,336 filed Mar. 15, 2013, the entirety of which is incorporated herein by this reference.

FIELD OF THE INVENTION

The present invention relates to a revolutionary new baking pan that, in one preferred embodiment, produces top loading hot dog buns.

BACKGROUND

Hot dogs and hot dog buns have existed for over a century and are firmly engrained in American culture. Americans enjoy eating hot dogs and this meal is as much a tradition as baseball and apple pie. During the three summer months between Memorial Day and Labor Day, Americans eat over seven billion hot dogs. It is believed that approximately 23 million hot dogs and 5 million sausages were consumed a major league baseball stadiums in 2011. A hot dog bun is a type of soft bun shaped specifically to contain a hot dog or frankfurter. There are two basic types: side-loading, also called American style buns, and top-loading, also called New England style rolls.

While hot dogs have been part of the American diet for over a century, the hot dog bun has shortcomings. For example, the added condiments tend to spill out of the bun and end up on the clothing of the consumer—particularly as the list of added condiments changes and expands with the ingenuity of the consumer. Further still, buns tend to split or separate at the seam or fold. This also leads to a loss of the added condiments. In addition, because of its rounded shape, a consumer is often unwilling to put down a hot dog bun once loaded with a hot dog and selected condiments because the bun has a tendency to roll over and spill the contents. Thus, once the loaded hot dog bun is picked up, one or both of the consumer's hands are occupied until the hot dog is finished.

Over this same time period, attempts have been made to change and improve the hot dog bun, but with little if any success. Despite its shortcomings, the configuration of the hot dog bun has remained fairly static over the past century and the long standing problems remain.

SUMMARY

To solve these and other problems with the hot dog bun, the NUBUNS™ baking device was developed. This is a revolutionary new design made to bake a bun that will hold the hotdog or frankfurter securely without breaking or dumping all the condiments or toppings on your clothing as you eat. In one embodiment, the baking device produces a top loading bun, generally U-shaped in cross-section, with three sides and a flat base that is closed at one end. The bun loads from the open top and is sturdy enough to hold its shape and its added contents, including condiments, securely without spilling out while eating them. Because of its flat base, it sets securely on a plate or surface without falling apart or rolling to its side. In a second embodiment, the both ends of the bun will be closed. The trademark NUBUNS™ is owned by the assignee of the present application and refers to, among other things, the baking apparatus described herein and product(s) made by the various embodiments described herein.

In one embodiment, the baking device comprises a base pan, a top pan and a frame or linkage for securing the position of the top and base pans relative to each other during baking The base pan comprises a generally planar body portion with one or more cavities for receiving dough or batter. The cavity walls form the outer surface of the bun. The top pan comprises a generally planar body portion with one or more protruding members or molds, where each single mold or protruding member nests in a single cavity of the base pan. A gap or space is formed between the cavity walls and the mold walls. The walls of the mold or protruding member form the inner surface of the bun. The frame is adapted to fit around the circumference or perimeter of the top and base pans and to hold them in position relative to each other. The frame members may be designed with a variable release mechanism to release if the internal pressure increases beyond a predetermined or threshold amount, for example if too much dough or batter is placed in the device.

The baking pan apparatus described herein is a versatile baking device. When used to bake yeast based dough, the resulting bun can accommodate a myriad of contents including, but not limited to, all small sausages, all loose meat, poultry, fish, and food products (weather shredded, cut, sliced, or diced, stand alone or mixed with other foods.) Examples of such foods are brats, sloppy Joes, tuna salad, and deli meats, pulled pork, brisket, and salads, fajitas, gyros, etc.

When used to bake a cake batter, the resulting bun can accommodate a myriad of contents including, but not limited to, cream fillings, ice cream, fruit, vegetables, etc.

As one of skill in the art will realize, upon reading the present disclosure, different dough or batter recipes will provide different end product applicable for different uses and different food products. Similarly, different baking recipes can change the texture and finish of the final product. Buns made with embodiments of the baking device of the present application can be used for essentially any meal or snack including, but not limited to appetizers and hors d'oeuvres, main meals, and desserts.

DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention, or that render other details difficult to perceive, may have been omitted. It should be understood, of course, that the invention is not necessarily limited to the particular embodiments illustrated herein.

DETAILED DESCRIPTION

Figure 1:
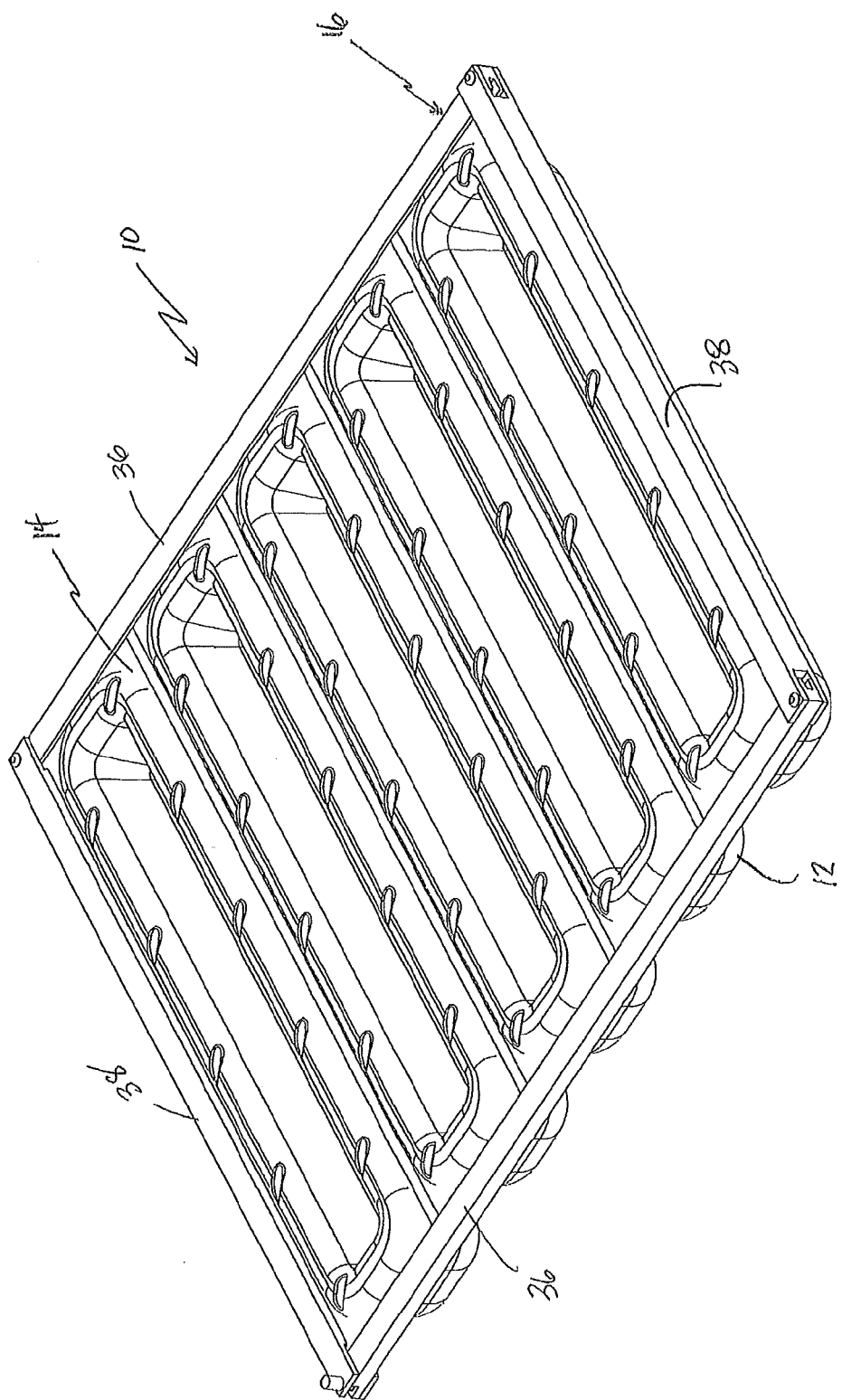
FIG. 1 is a perspective view of a fully assembled baking pan according to one embodiment of the present invention.
Figure 2:
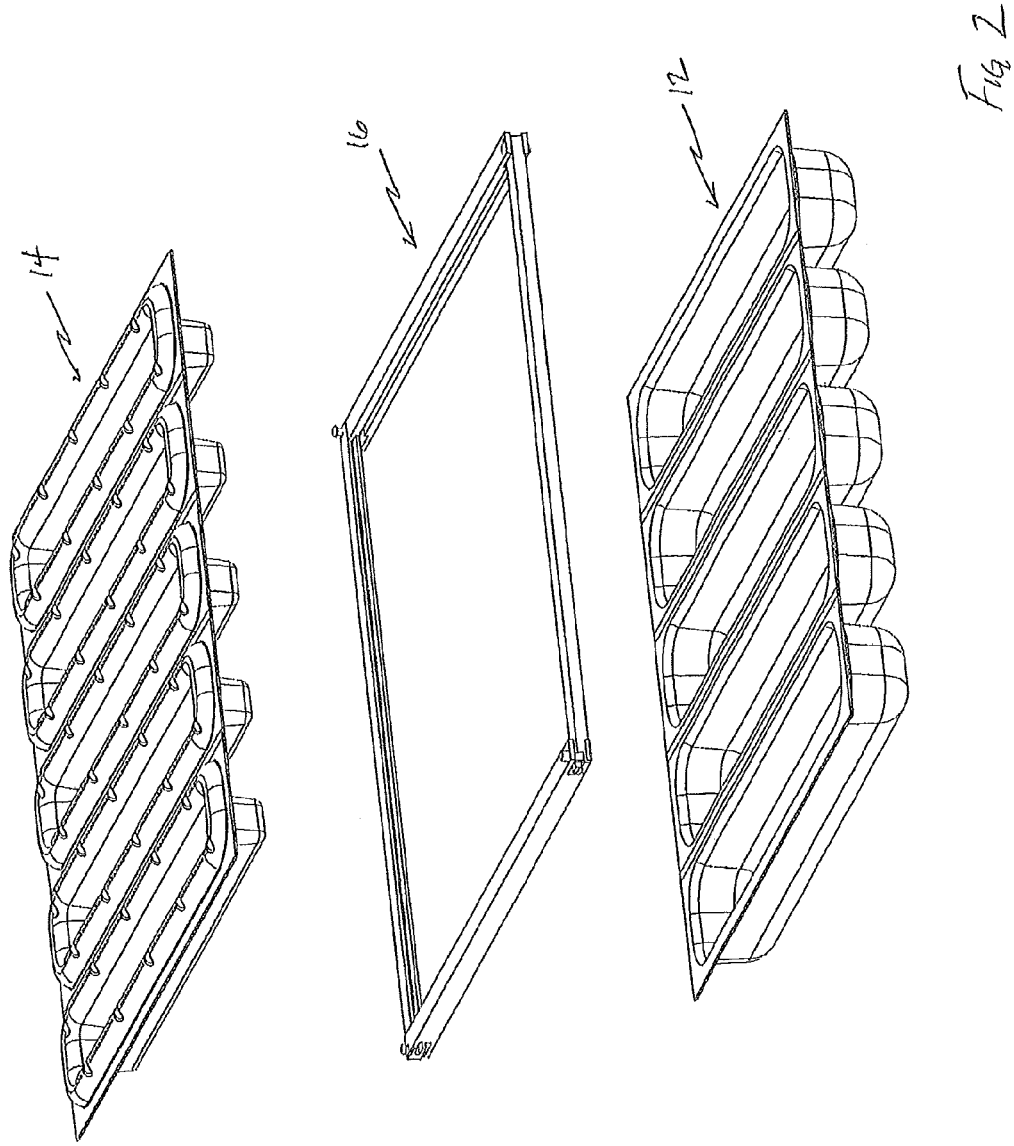
FIG. 2 is an exploded perspective view of the baking pan assembly shown in FIG. 1, showing the base pan, the top pan and the assembled frame members.

As can be seen generally from the drawings and specifically in FIGS. 1-2, in one embodiment the baking pan apparatus 10 comprises three components: a base pan 12, top pan or cover 14 and a frame assembly 16.

In the embodiment of FIGS. 1-11, the base pan 12 comprises five cavities 18. Those of skill in the art will appreciate that fewer or more cavities may be incorporated into a single base pan 12. Similarly, it should be appreciated that the physical dimensions of the individual cavities 18 may change. For example, depending upon the food product to be placed into the finished bun, the lengths and widths of the cavities may vary. The cavities may be dimensioned to accommodate traditional hot dogs, twelve inch hot dogs, bratwurst, polish sausage, delicatessen meats, barbeque, and a variety of other products. It should also be appreciated that the cavities may be designed so that the final bun product produced from a single cavity accommodates single or multiple products. For example, 1 or 2 standard sized hot dogs buns may be produced from a single cavity. If a standard sized hot dog is approximately 6 inches in length, the cavity may be made approximately 12 to 13 inches in length and cut in half when removed from the pan. One-half of the bun will be used for one hot dog and the other half of the bun will be used for the second hot dog. The length of the bun may be designed to fully envelop the hot dogs or to be slightly shorter in order that a portion of the hot dog extend out the cut end of the bun.

As illustrated in FIGS. 2-7, in a first embodiment, the base 12 comprises a rectangular shape with a perimeter edge 20 and a generally flat body 21. In one embodiment, the base 12 may be formed by stamping a single sheet of metal, such as aluminum. In a preferred embodiment of the baking pan 10, the bottom surface 22 of the individual cavities 18 of the base is formed with a flat portion 24. This results in a finished bun that has a generally flat bottom surface. As a result, the bun is capable of standing upright and not rolling over. This facilitates placement of food products and condiments in or onto the food product in the bun. It also enhances the ability of the consumer to set down the hot dog and bun between bites and not be concerned with the bun rolling over. Each cavity further comprises a pair of spaced apart sidewalls 15 and a pair of spaced apart end walls 17 that extend between the edge of flat bottom portion 24 and the flat body 21. In one embodiment, the side walls and end walls are generally sloped outwardly.

Figure 8:
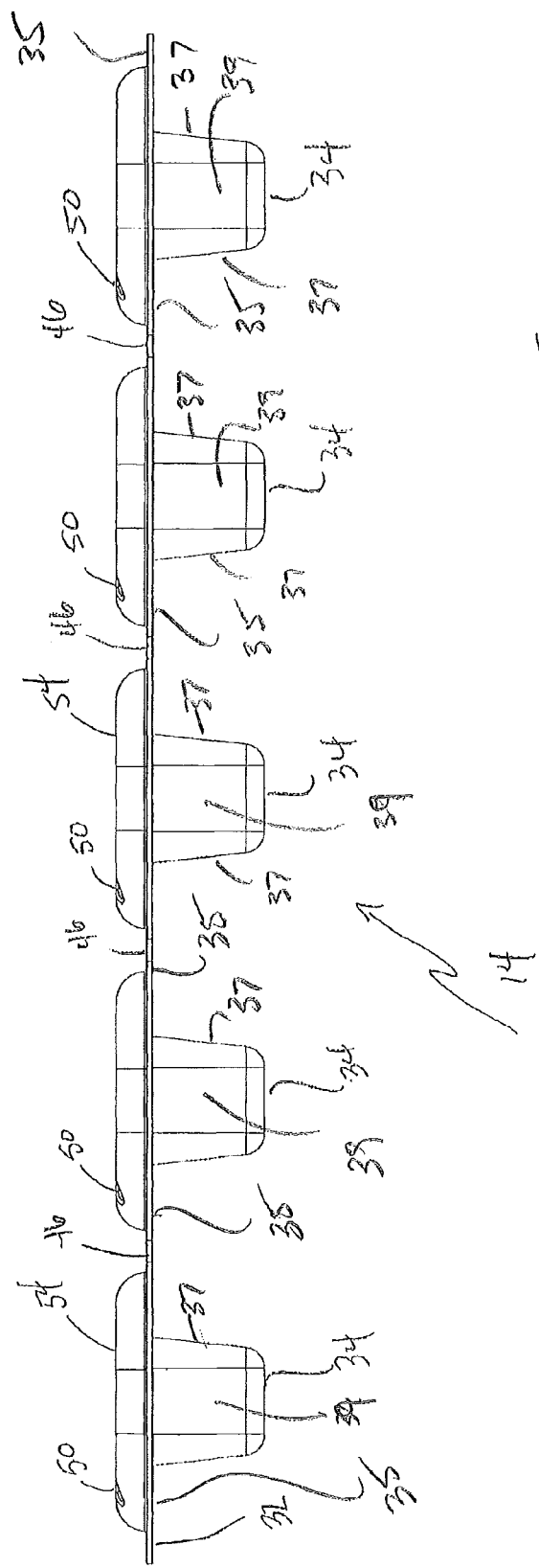
FIG. 8 is an end elevation view of the cover of the baking pan shown in FIG. 2.
Figure 9:
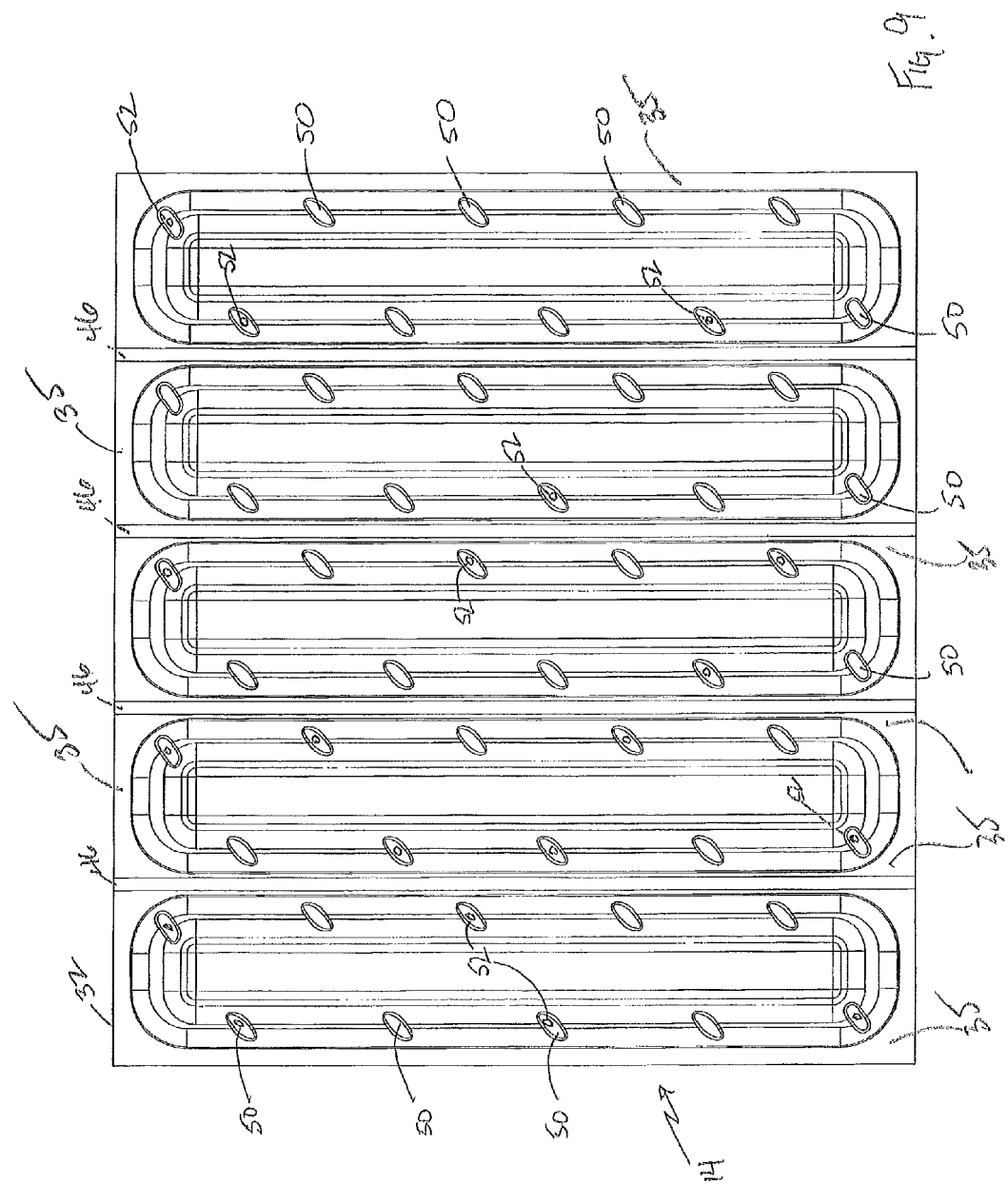
FIG. 9 is a top plan view of the cover shown in FIG. 2.
Figure 10:
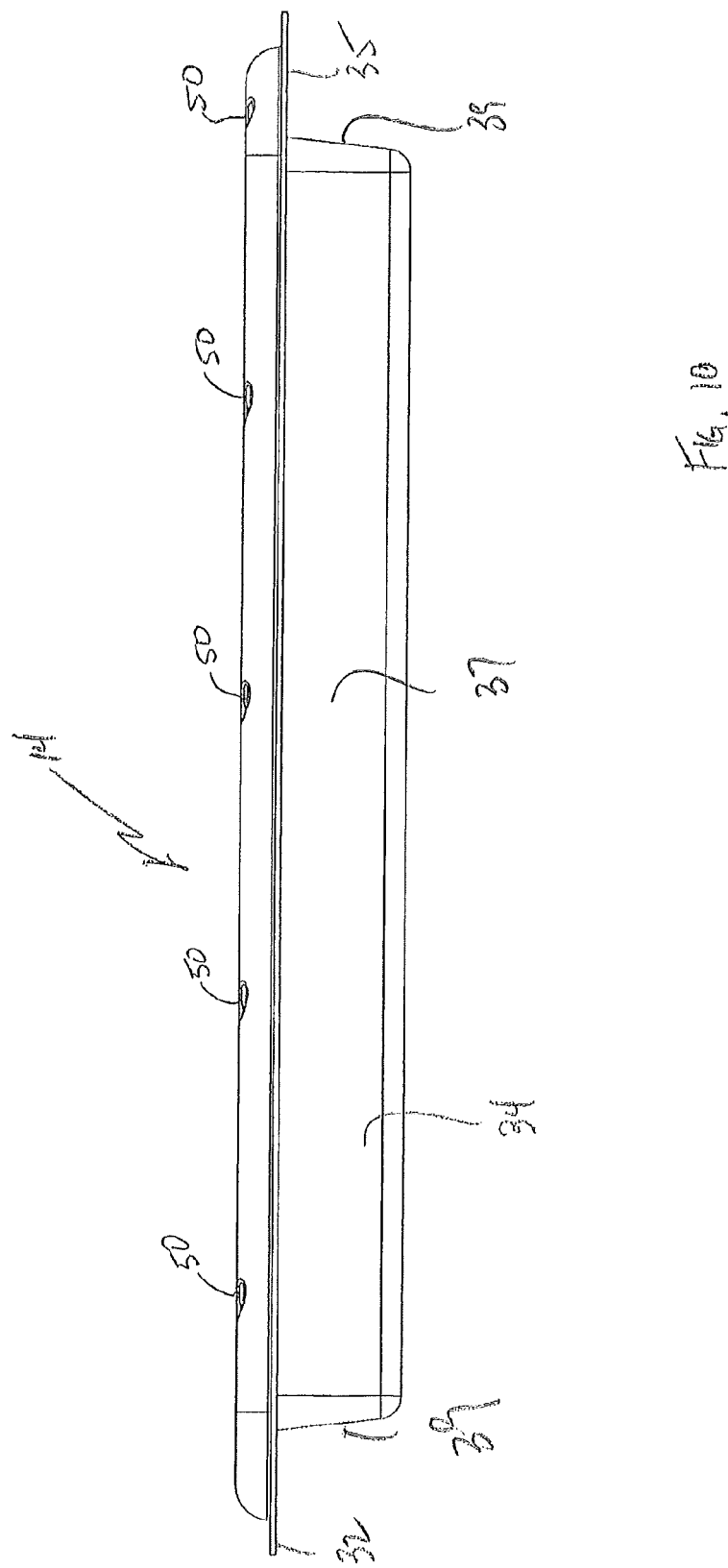
FIG. 10 is a side elevation view of the cover shown in FIG. 2.
Figure 11:
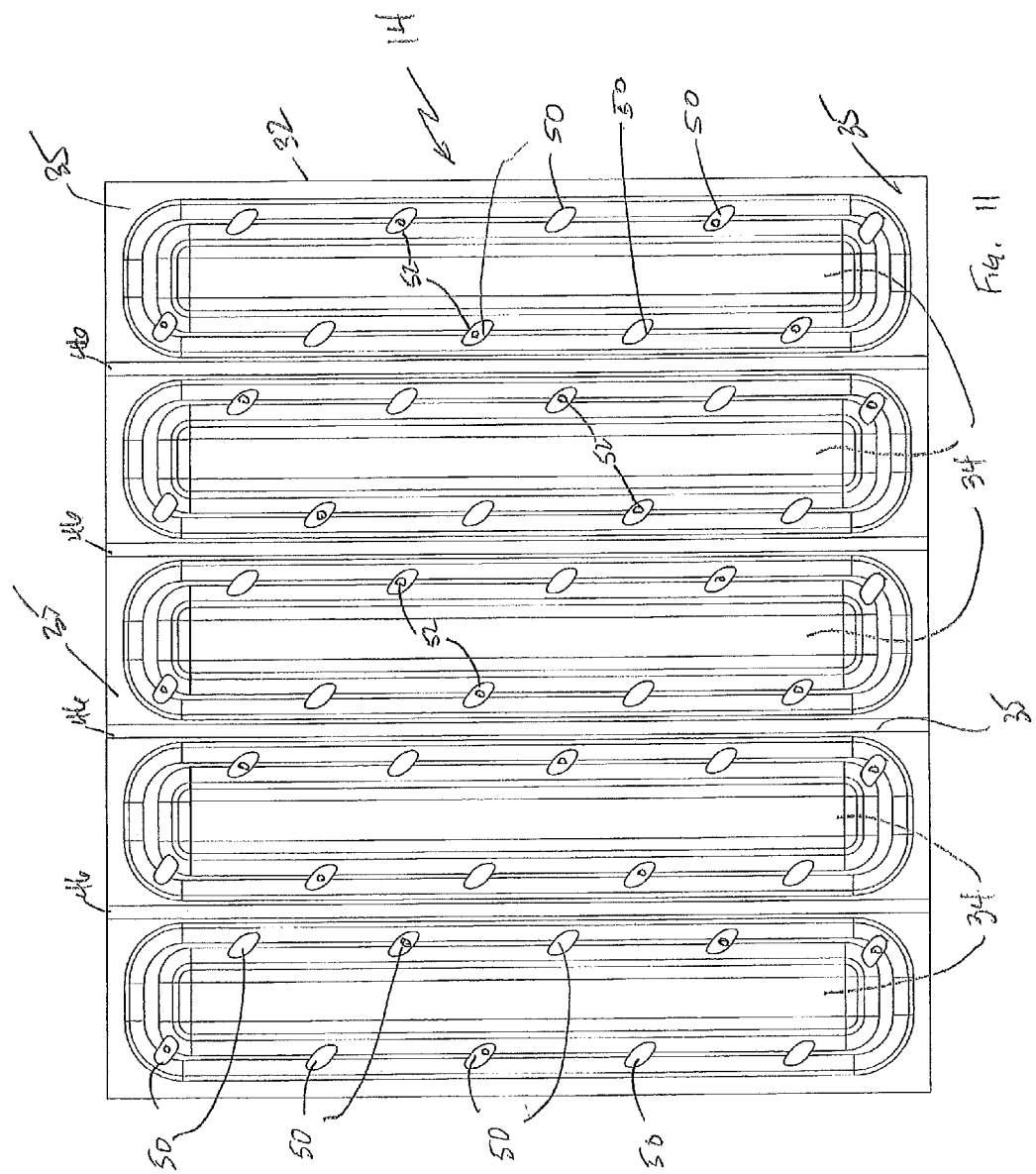
FIG. 11 is a base plan view of the cover shown in FIG. 2.

As illustrated in FIGS. 2-4 and 8-11, the top cover or pan 14 of the first embodiment comprises a rectangular shape with a perimeter edge 32. In one embodiment, the cover 14 may be formed by stamping a single sheet of metal, such as aluminum. The top cover compliments the base and, in this embodiment, it is provided with five protruding members or molds 34. The top cover further has a flat body 35 extending between the molds and the perimeter edge. The number of molds 34 will match the number of cavities 18 in the base 12. The molds 34 each have a pair of spaced apart side walls 37 and end walls 39, with inner and outer surfaces. As illustrated in FIGS. 8-10, the perimeter of each mold 34 may comprise an upper perimeter portion 54 that extends between the side walls and end walls and the flat body. When assembled with the base 12, each individual mold 34 nests within an individual cavity 18 of the base 12.

Figure 19:
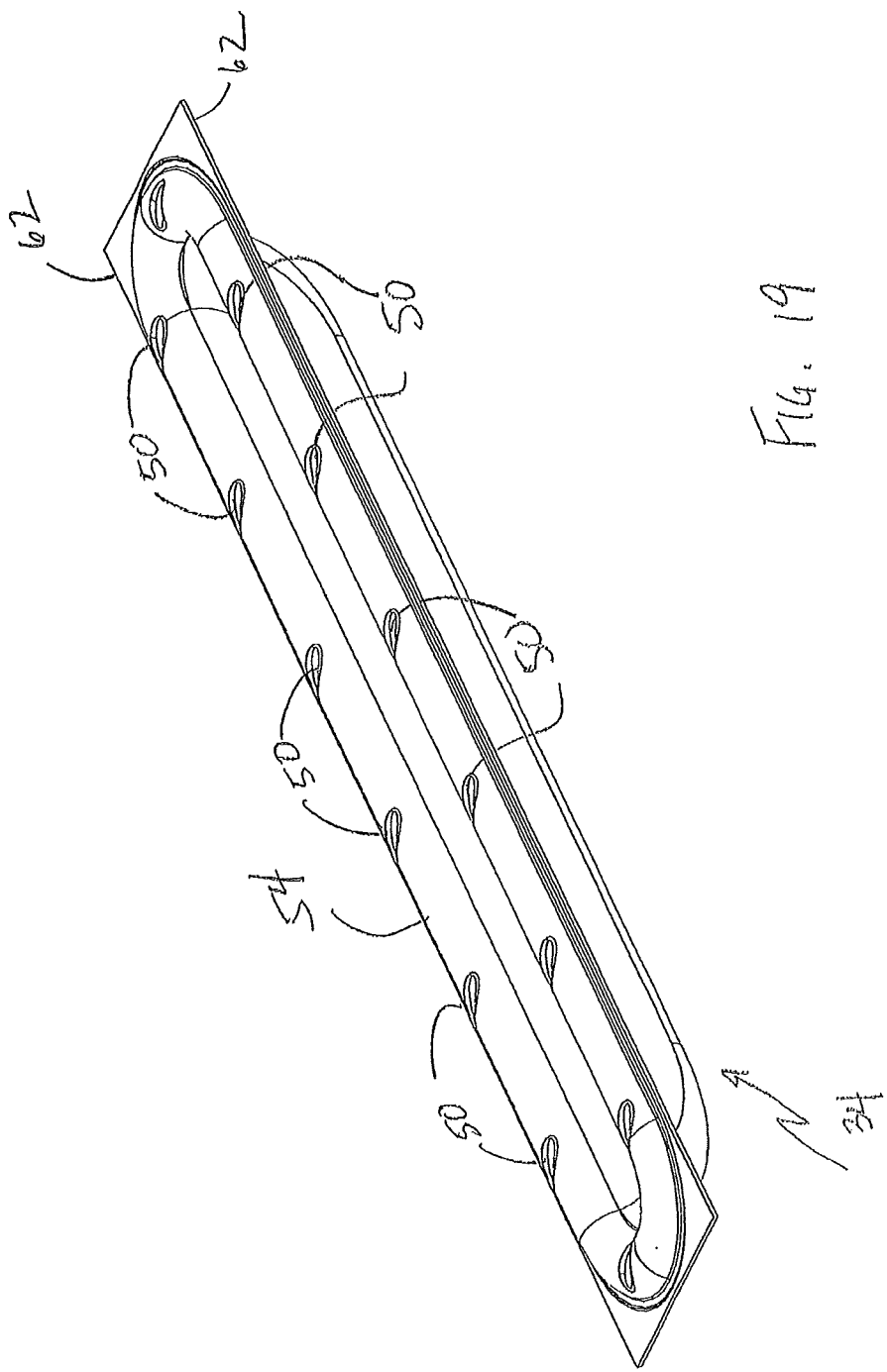
FIG. 19 is a perspective view of a single mold of one embodiment of a top pan, showing design indentations formed in the cavity for creating an aesthetic finish on the bun.
Figure 20:
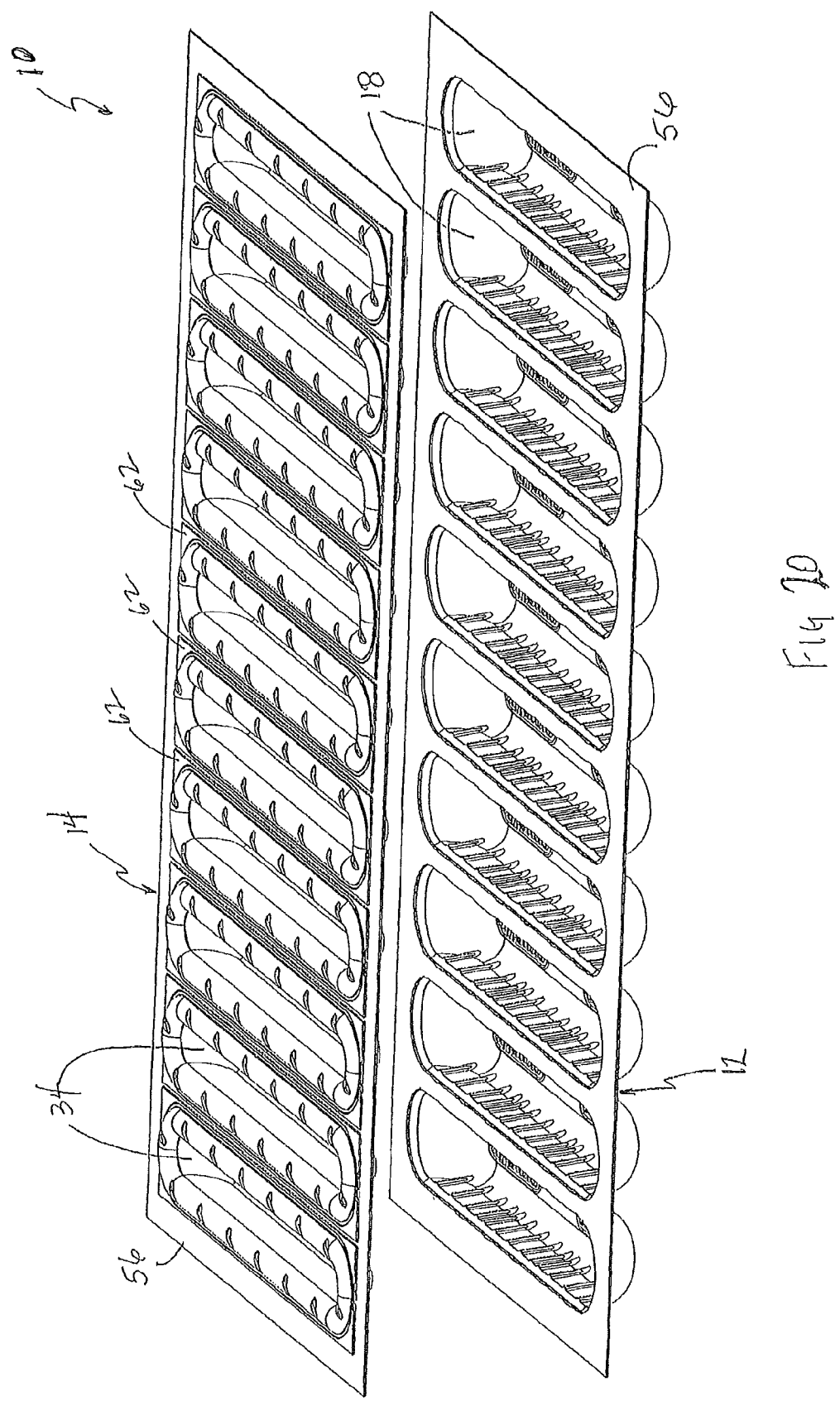
FIG. 20 is a perspective view of a base and top of a further embodiment of the baking pan of the present invention.
Figure 21:
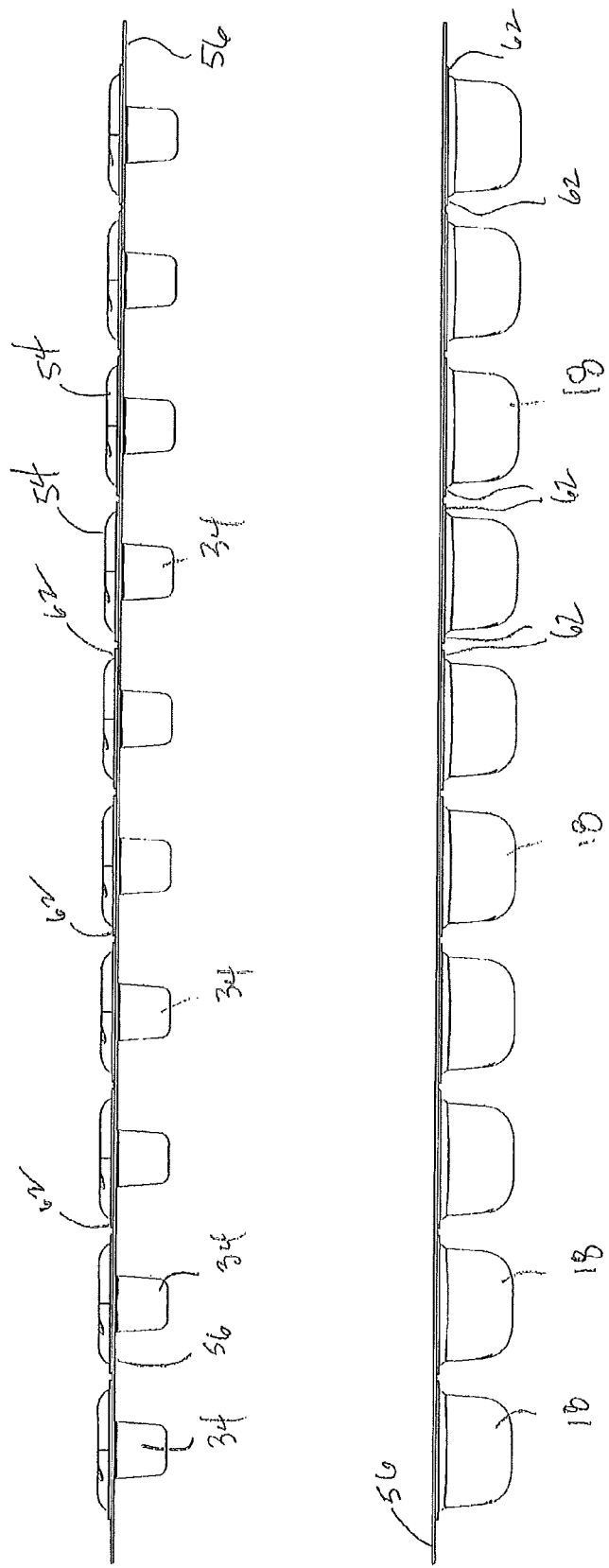
FIG. 21 is a front elevation view of the base and top illustrated in FIG. 20.
Figure 22:
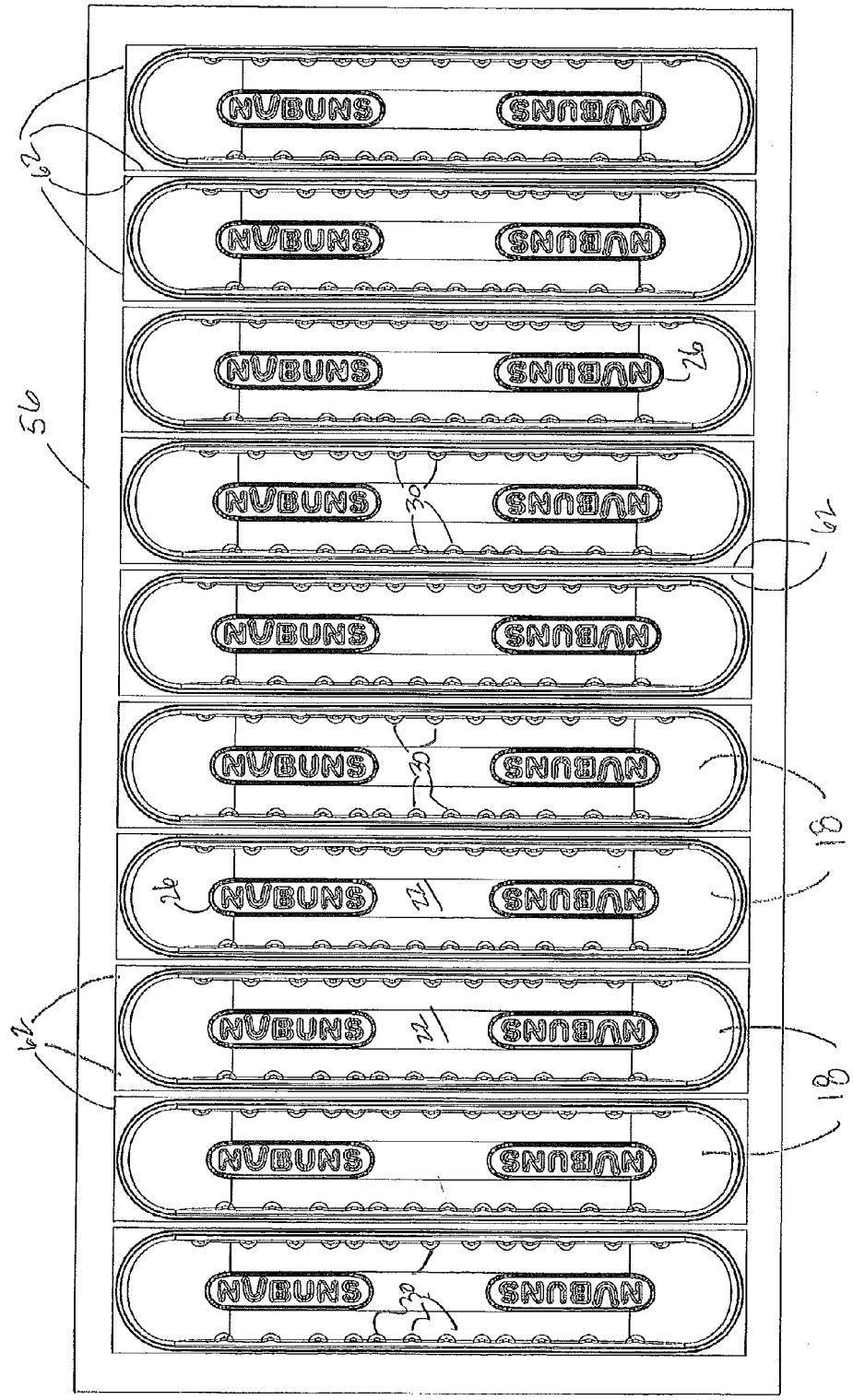
FIG. 22 is a top plan view of the base illustrated in FIG. 20.

Either or both of the cavities 18 within the base 12 and the molds 34 within the top cover may be configured to provide an aesthetic look as may be desired. For example, indentations/protrusions 50 may be formed into the mold 34 or into the cavity walls to provide the look of a baking rack in an oven for breaking fresh bread. The indentations/protrusions 50 are also illustrated in FIGS. 19 and 20. As would be appreciated by those of skill in the art upon reading the present disclosure, different configurations may be utilized to provide different aesthetic effects to the finished product. In addition, ventilation holes 52 may be formed in the upper perimeter portion 54 of the molds 34 to permit equalization of pressure during the dough rising and baking processes, allowing the dough to properly rise.

Figure 3:
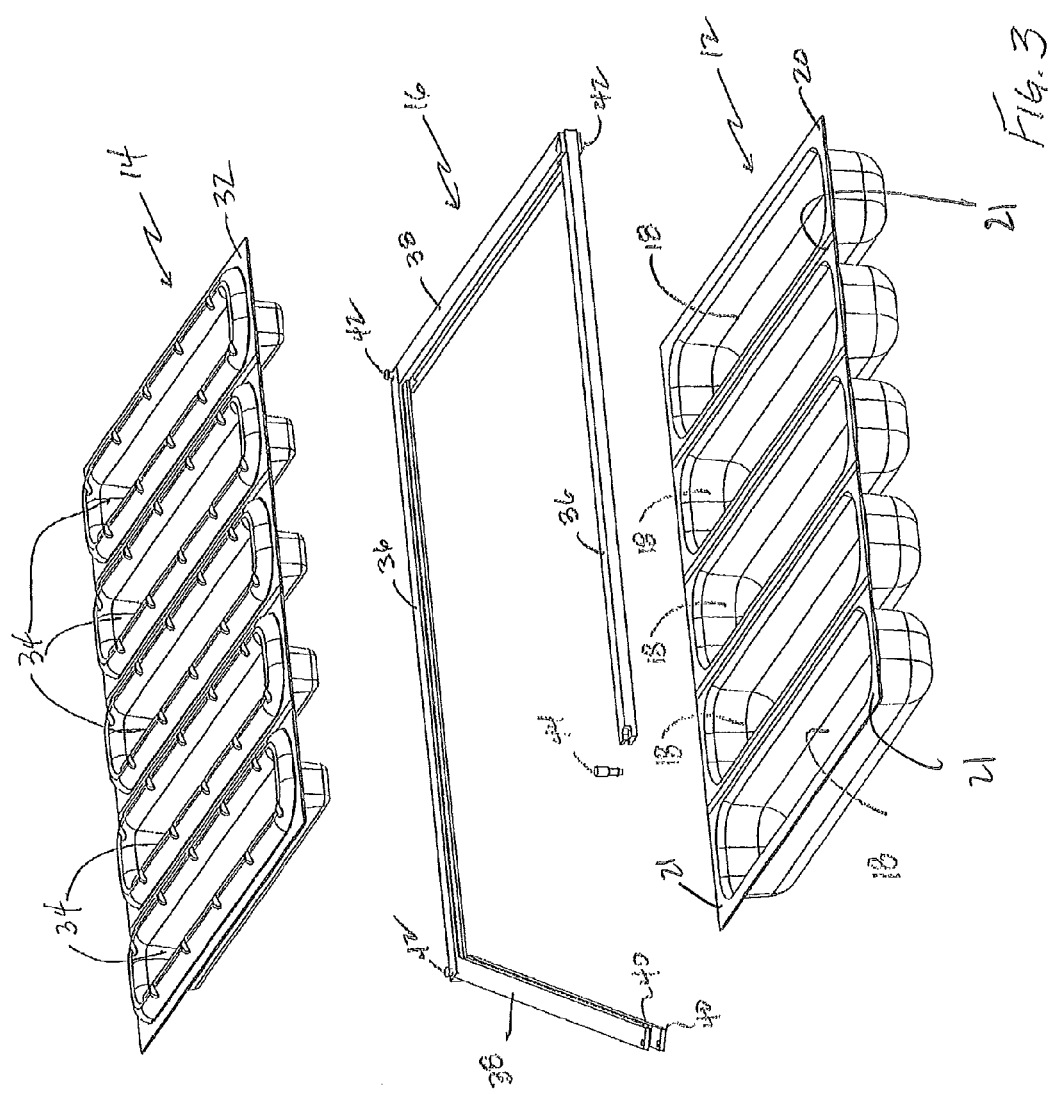
FIG. 3 is an alternative exploded perspective view of the embodiment of FIG. 2, showing the frame assembly partially disassembled.
Figure 4:
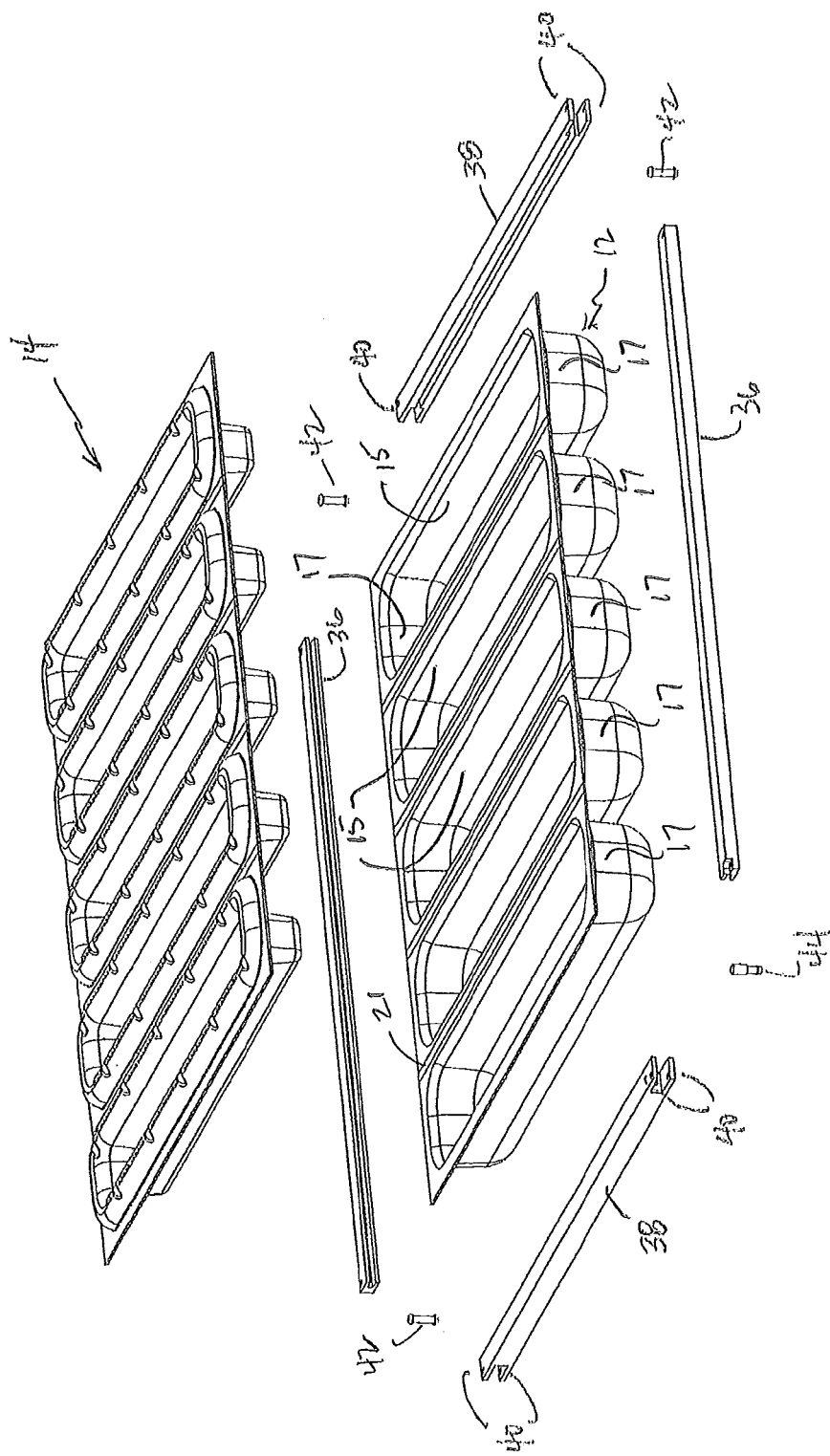
FIG. 4 is a further alternative exploded view of the embodiment of FIG. 2, showing the frame assembly fully disassembled.
Figure 5:
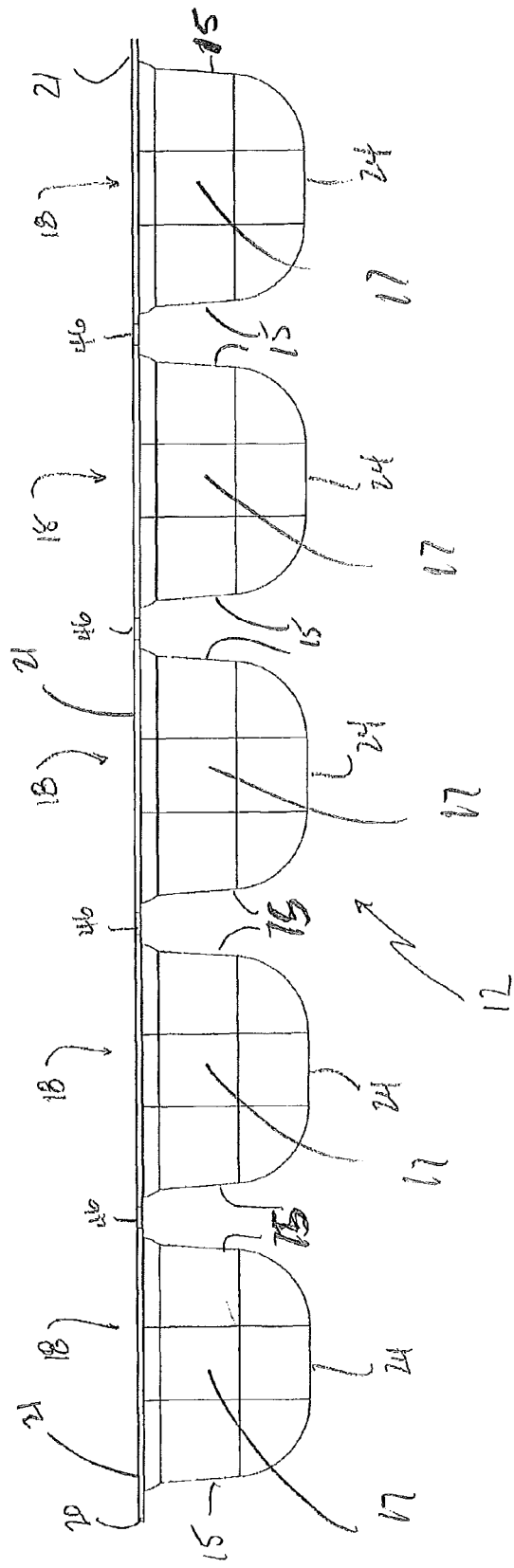
FIG. 5 is an end elevation view of the base of the baking pan shown in FIG. 2.
Figure 6:
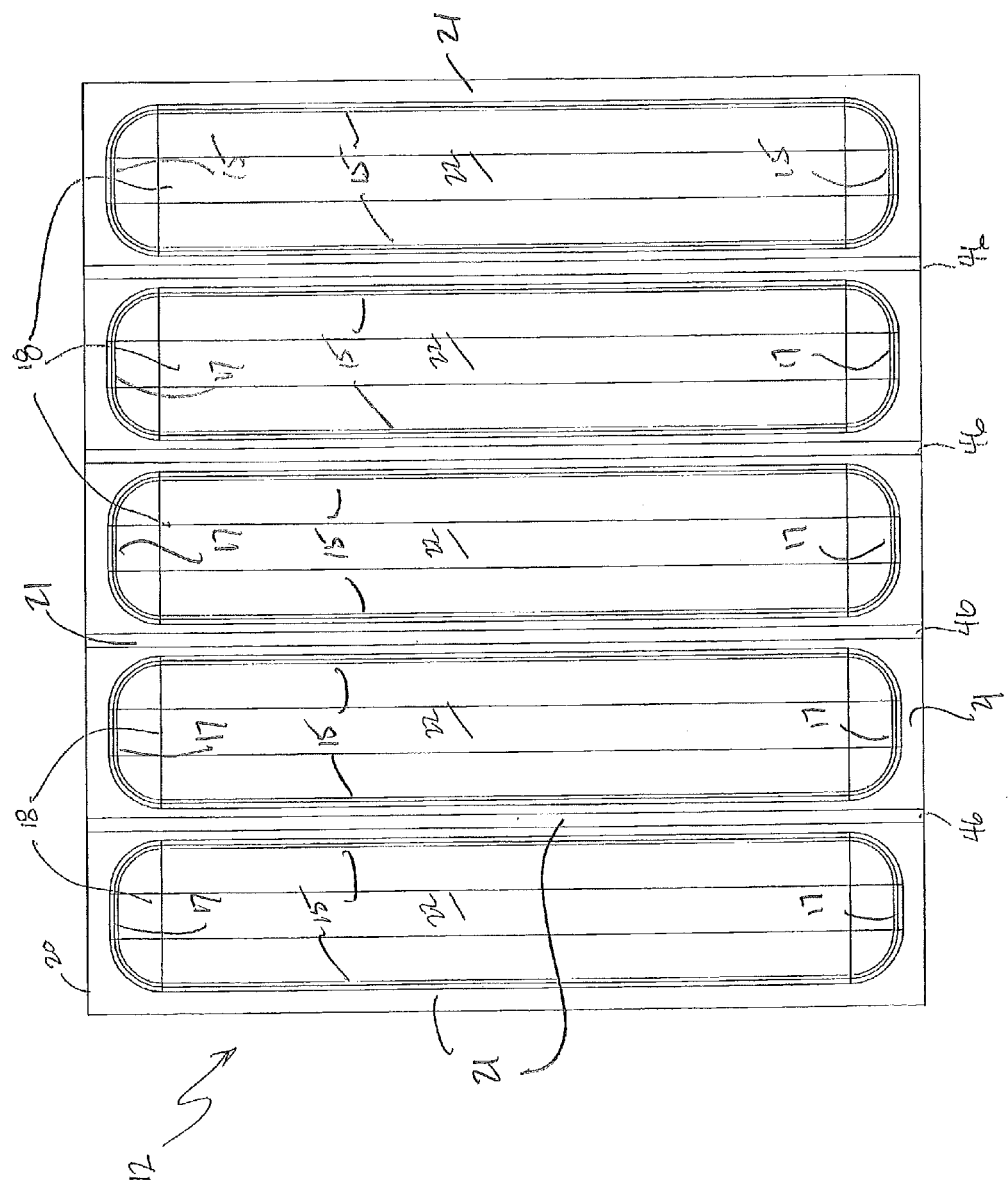
FIG. 6 is a top plan view of the base of the baking pan shown in FIG. 2.
Figure 12:
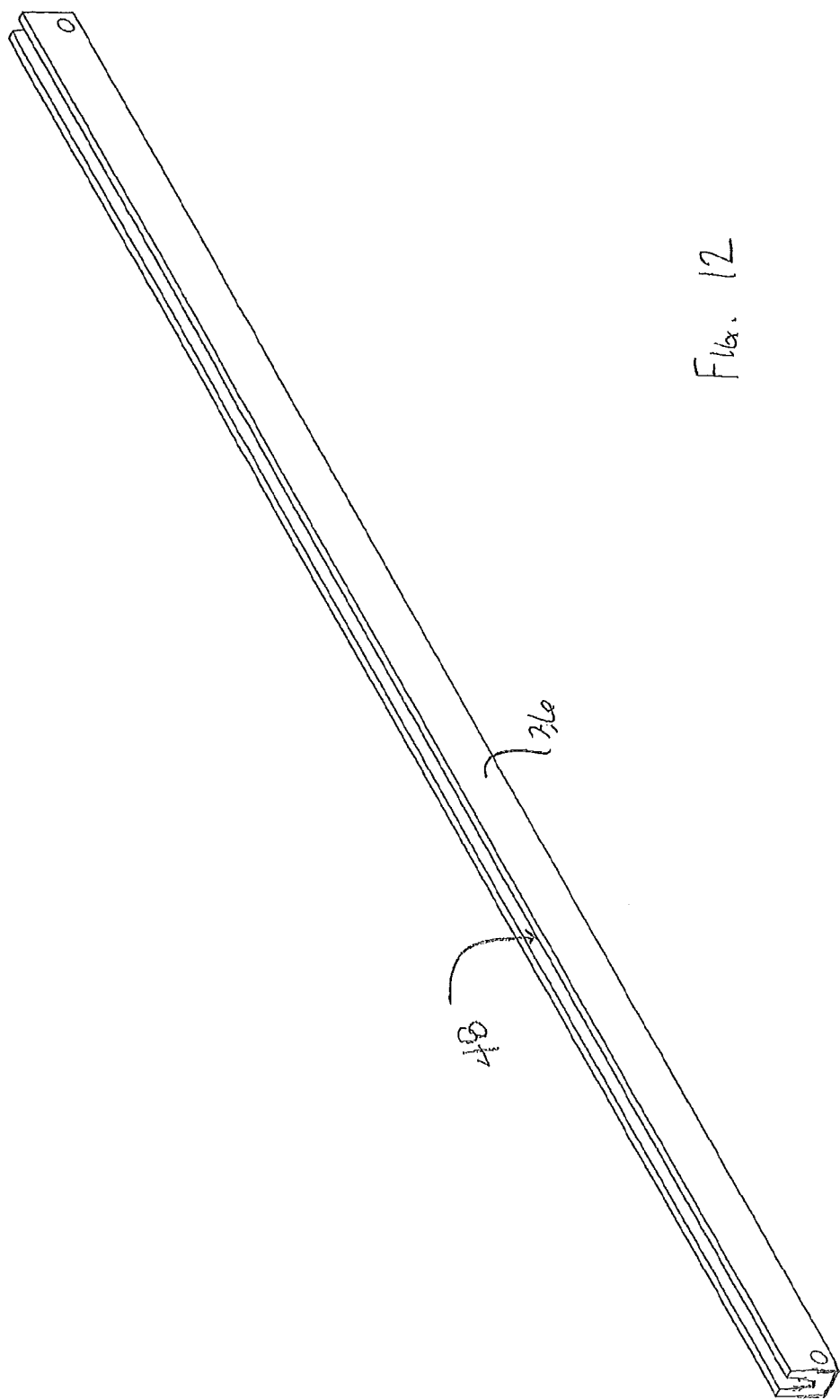
FIG. 12 is a perspective view of one of the two frame members that comprise the frame assembly shown in FIGS. 1-4.
Figure 13:
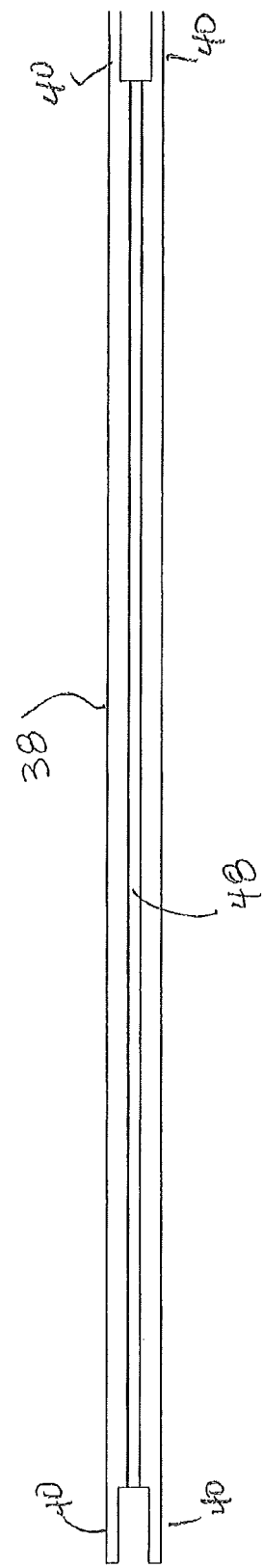
FIG. 13 is a front elevation view of the second of the two frame members that comprise the frame of assembly shown in FIGS. 1-4.
Figure 14:
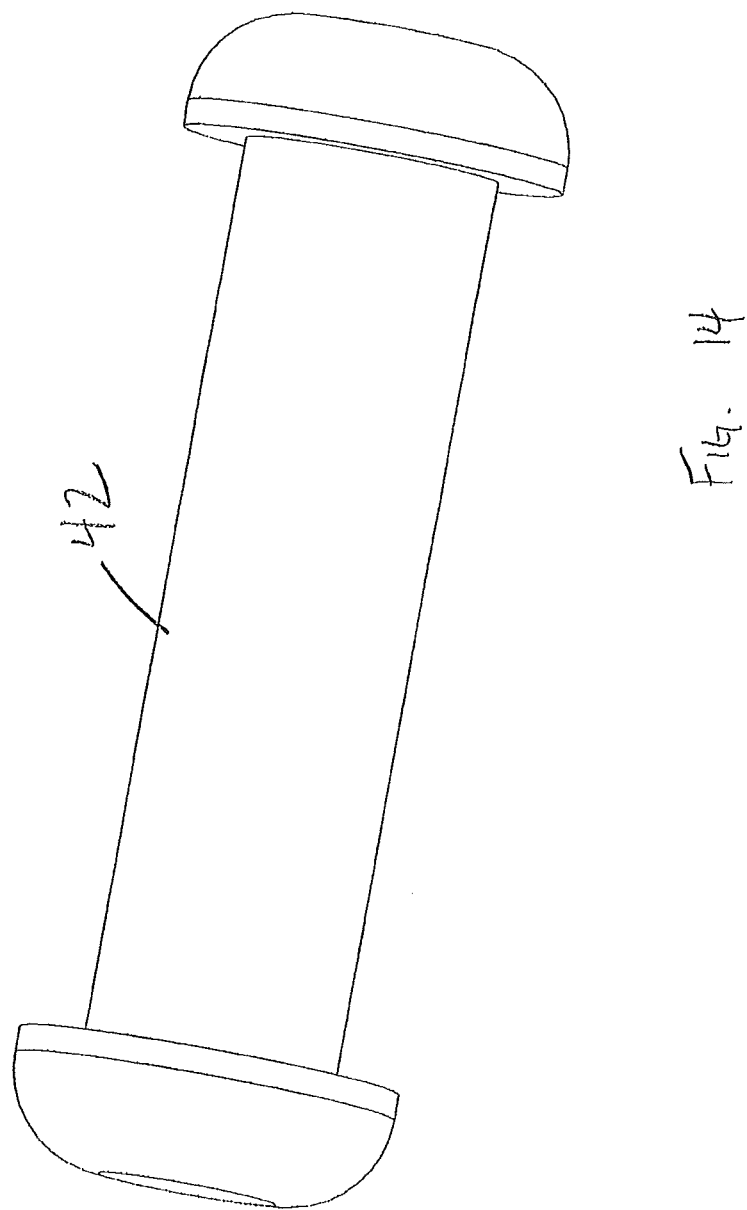
FIG. 14 is a perspective view of a pin used in assembling the frame assembly shown in FIG. 1.
Figure 15:
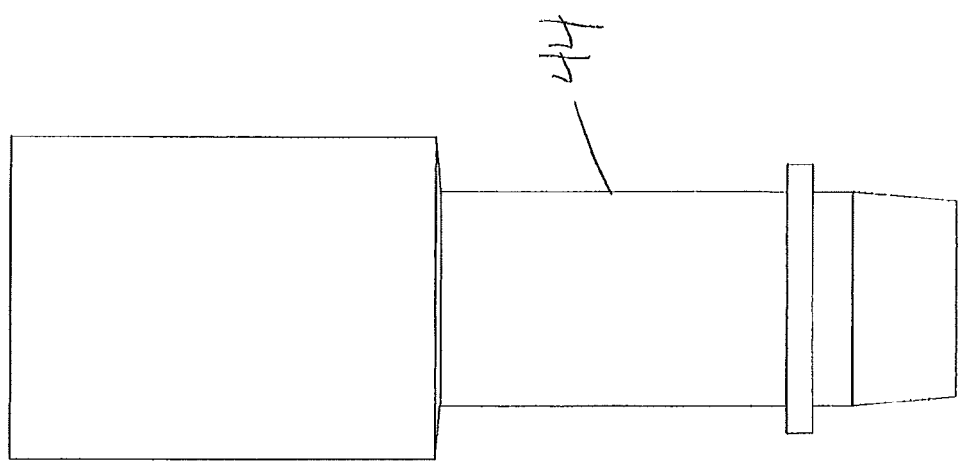
FIG. 15 is a front plan view of a removable closure pin used to close the frame assembly shown in FIG. 1.

The frame assembly associated with the first embodiment is illustrated in FIGS. 1-4 and 12-15. The frame comprises four frame members. Two frame members 36, best shown in FIG. 12, are generally U- or C-shaped with a groove formed to receive the perimeter edges 20 and 32 of the base 12 and cover 14, respectively. The other two frame members 38 are also generally U-shaped, but further comprise spaced apart outwardly extending flanges 40 at each end to receive the ends of the frame member 36. The groove formed in each of the frame members may be tapered from the front edge toward the bottom of the groove to force the perimeter edges 20 and 32 together. A rivet or pivot pin 42 is shown in FIG. 14 and interconnects the frame 36 and 38 at three of the connection points. A removable pin 44, illustrated in FIGS. 1-4, makes the fourth connection. It is removable from the frame members to permit the frame members to be disengaged from the baking pan 10, for example, as shown in FIG. 3.

Figure 16:
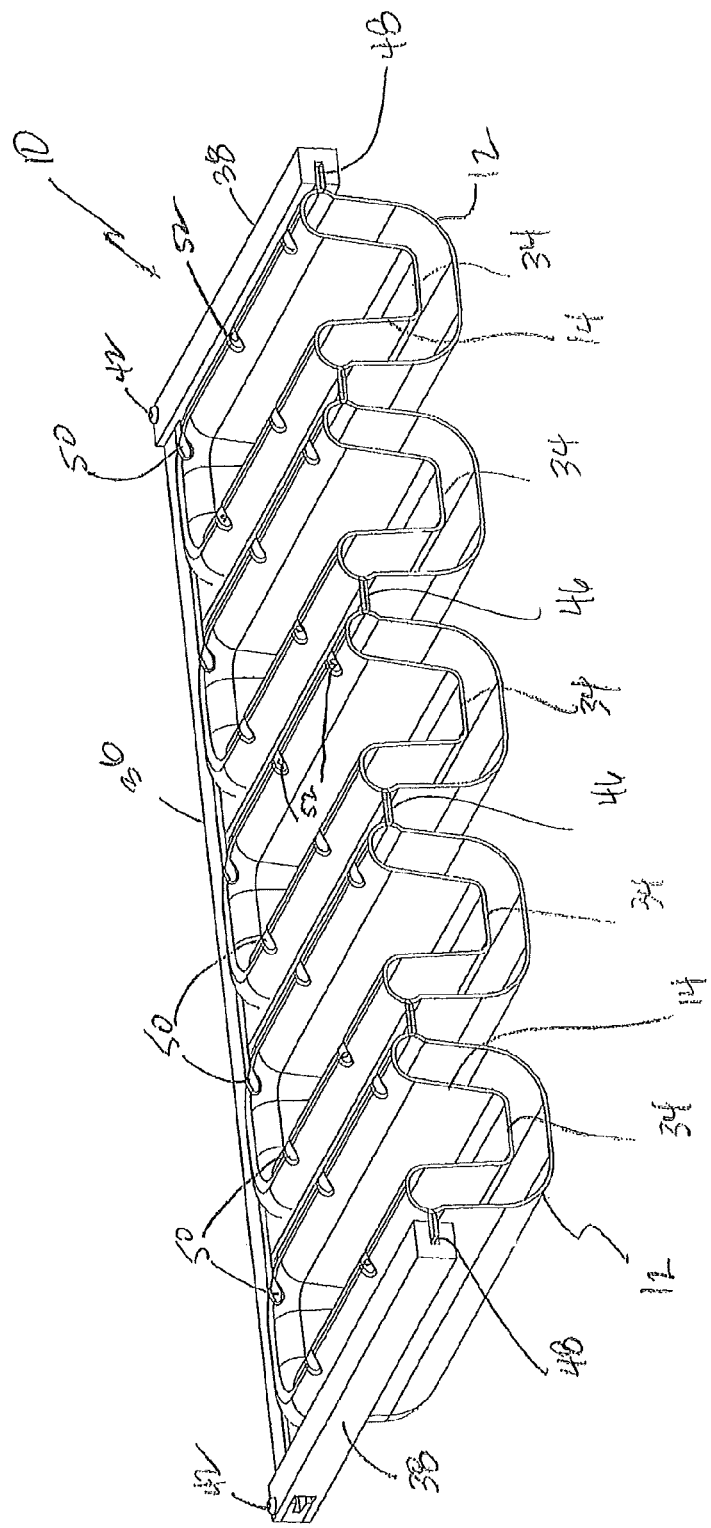
FIG. 16 is a cross-sectional view taken along line 16-16 of FIG. 1.
Figure 17:
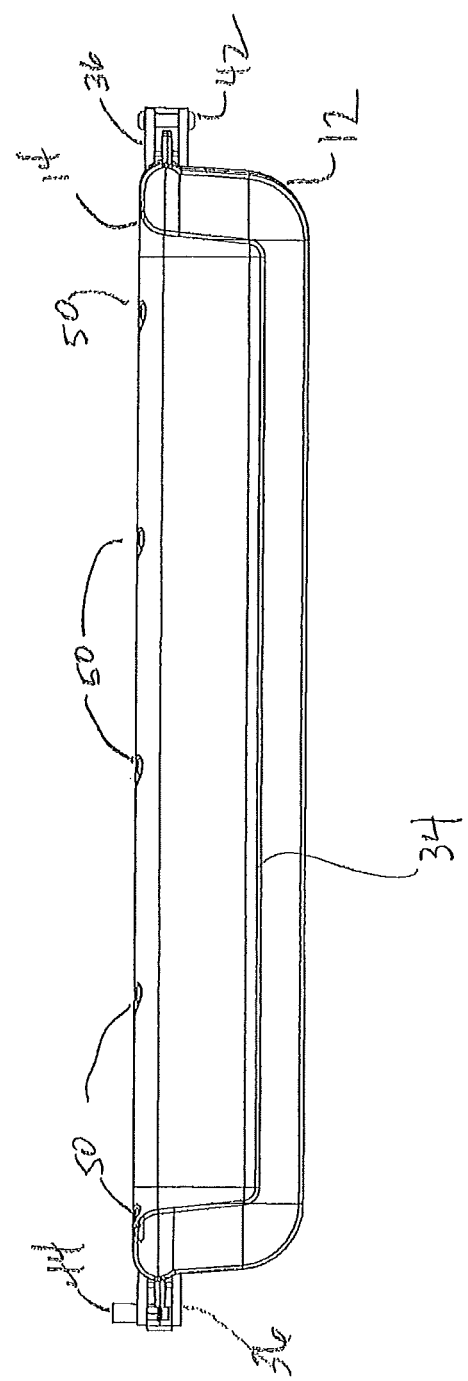
FIG. 17 is a cross-sectional view taken along line 17-17 of FIG. 1.

Cross-sectional views of o the baking pan 10 of FIG. 1 are shown in FIGS. 16-17. FIG. 16 illustrates a cross-section taken along the width of the bun and FIG. 17 illustrates a cross-section taken along the length of the bun. As shown, in one embodiment, the base 12 and the cover 14 generally comprise a substantially planar body including flat portions 46 along the perimeter of each cavity 18 and mold 34 to provide further support and alignment of the base and cover when nested. These views further show the perimeter edges 20 and 32 secured in the channels 48 formed in each of the frame members 36, 38. It should be further appreciated that the cross-sectional shape of the pan, shown in FIG. 16, may vary. As shown, the finished product would have a base with a flat portion, as mentioned above. However, the cavities do not need to be formed in this cross-sectional shape but can vary as desired by the end product.

Figure 18:
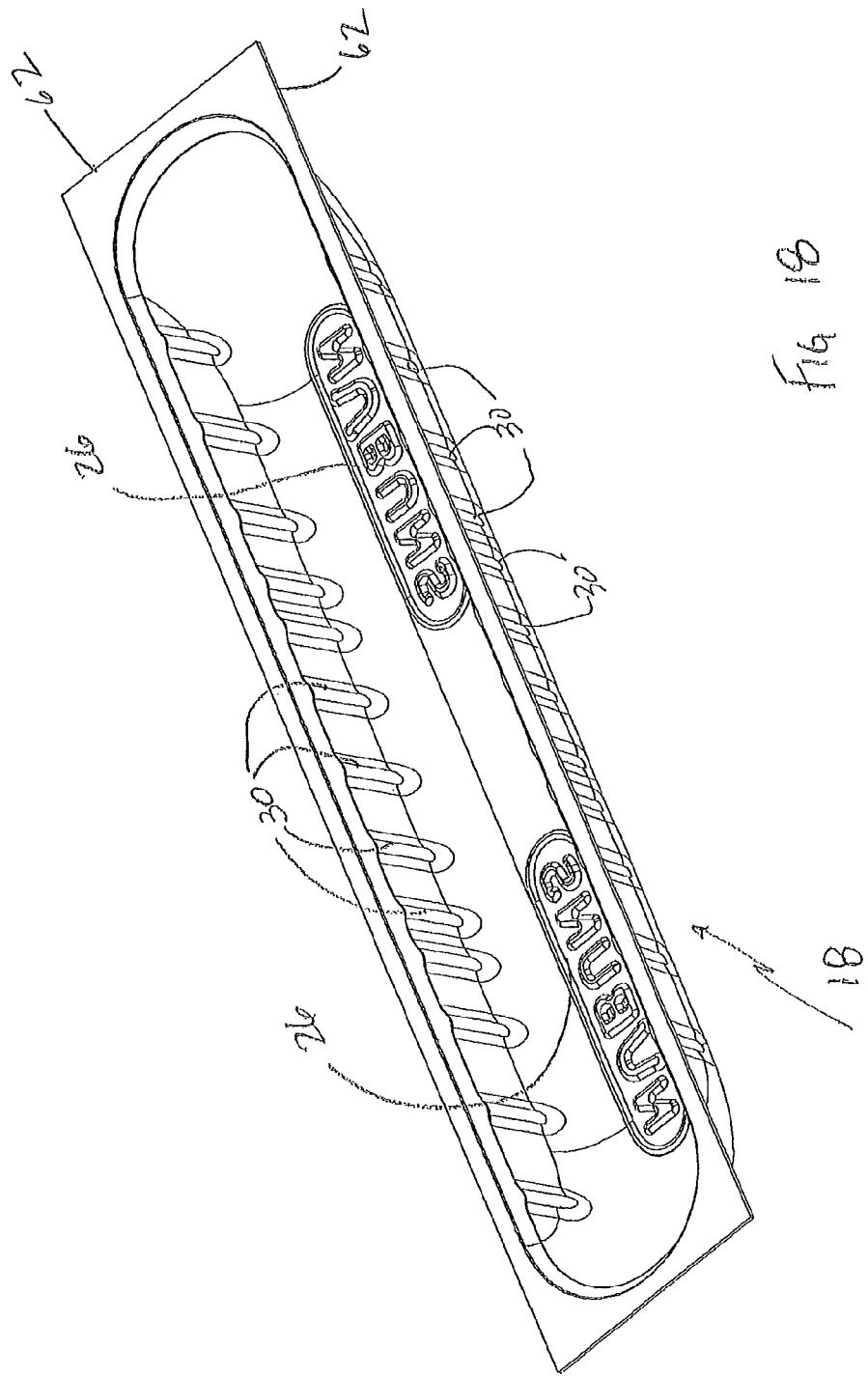
FIG. 18 is a perspective view of a single cavity of one embodiment of a base pan, further showing the NUBUNS™ trademark formed in the cavity.

FIGS. 18 and 19 illustrate a single cavity 18 and mold 34. In another aspect of the invention, described in more detail below, individual cavities 18 and molds 34 may be joined to create a base 12 and/or top 14 having multiple cavities and molds, respectively. The pans 10 shown in the embodiment of FIGS. 20-29 are constructed from multiple individual cavities 18 and molds 34 joined together.

Additionally, as shown in at least FIG. 18, it should be appreciated that a brand 26, such as a trademark like NUBUNS™, or a logo or other indicia or marking, may be formed into each cavity 18 or, alternatively into the top 14 to form a unique brand in the finished baked product. This not only serves as a marketing tool, promoting brand awareness by consumers, but allows bakers to identify their products and police licensees, distributors, food service companies, restaurants and the like for compliance and quality control obligations. FIG. 18 further illustrates ribbing elements 30 formed in the side walls of the cavities 18. The ribbing elements provide aesthetic design features to the finished bun, such as suggesting lines formed by a wire rack in an oven or surface features that are associated with fresh baked bread. This may provide a more pleasing and desirable aesthetic for the consumer. As should be appreciated, different design aesthetics may be added to the surface of the cavity 18 to produce different results.

Figure 23:
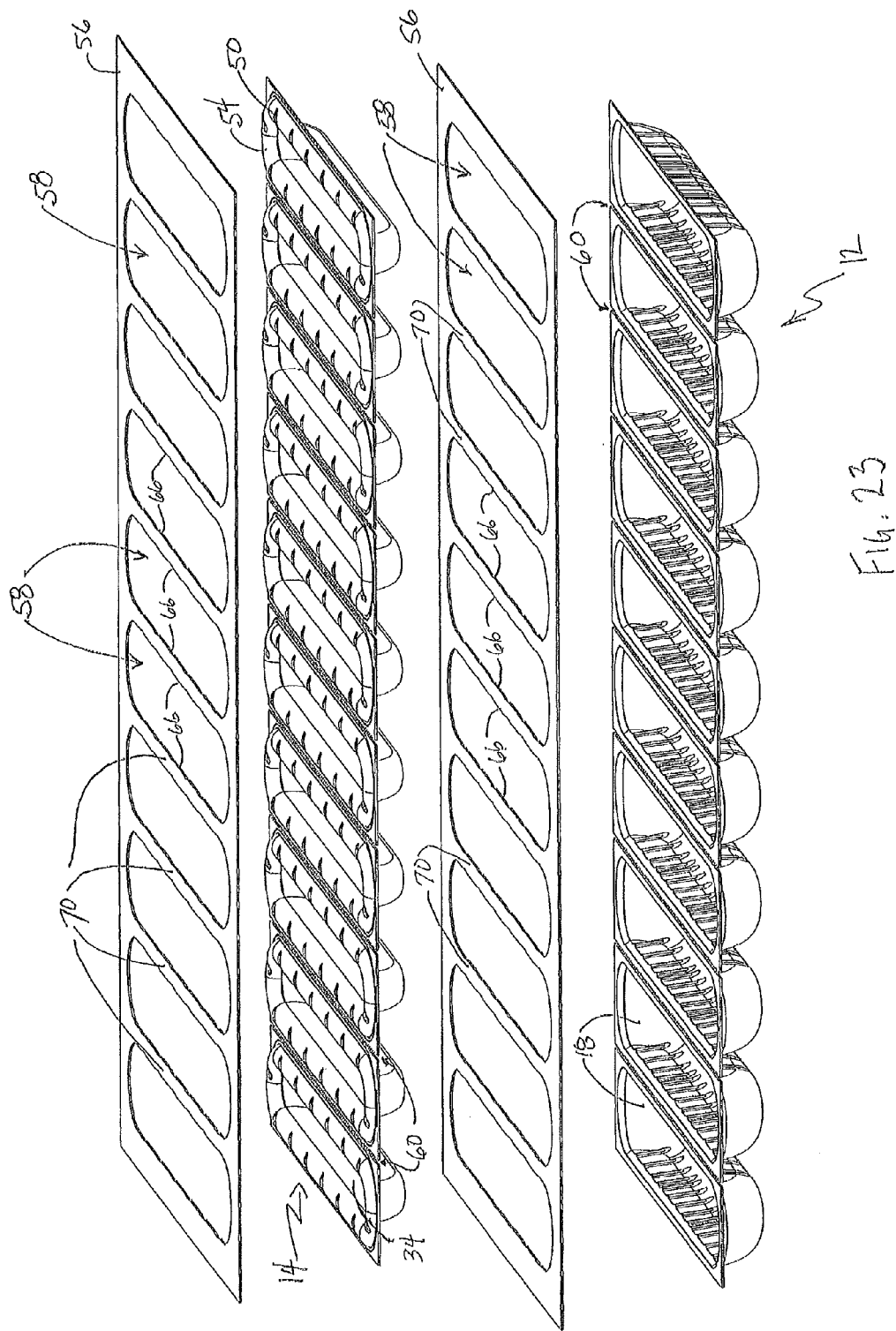
FIG. 23 is an exploded perspective view of the baking pan illustrated in FIG. 20.
Figure 24:
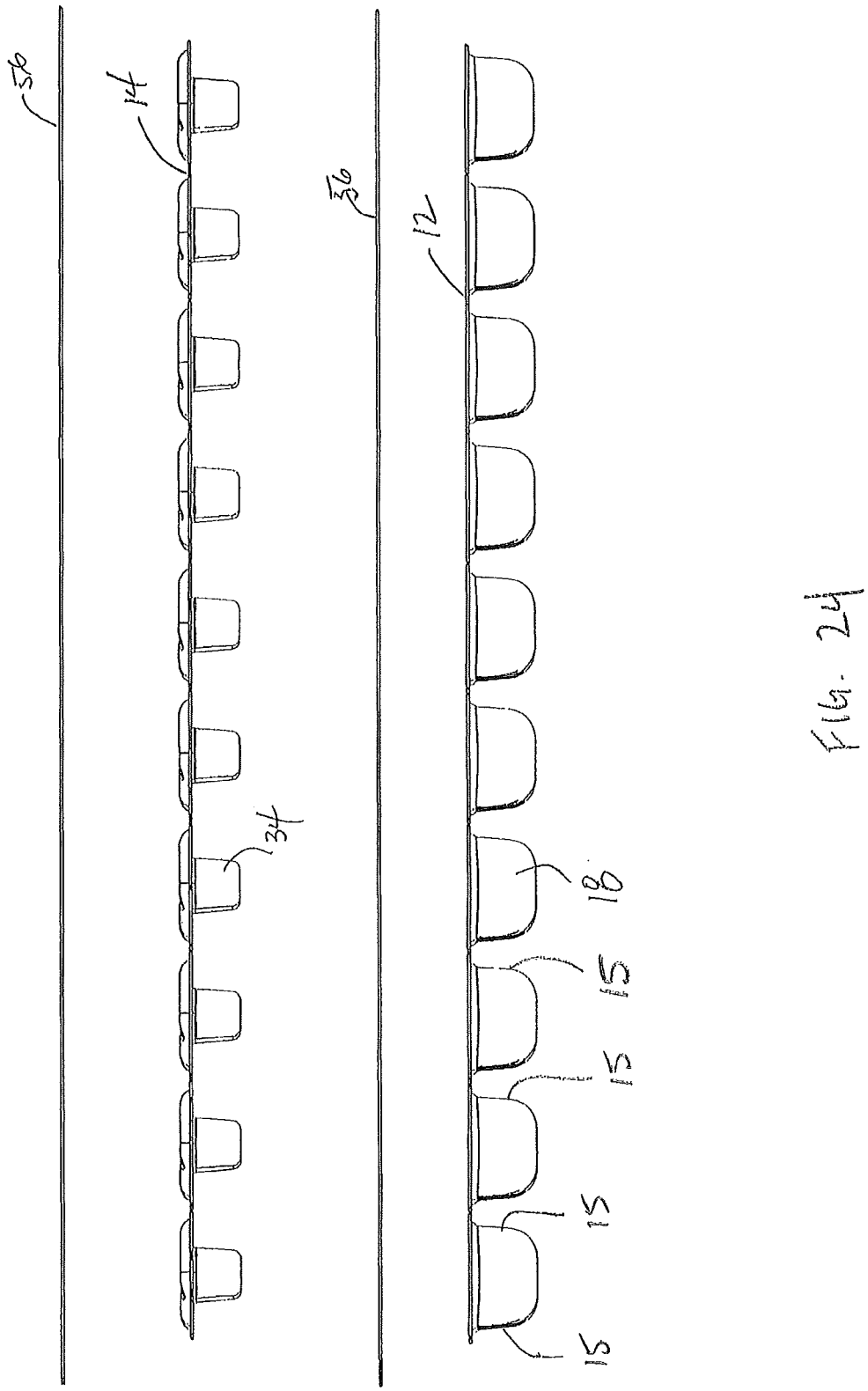
FIG. 24 is a front elevation view of the embodiment shown in FIG. 23.
Figure 25:
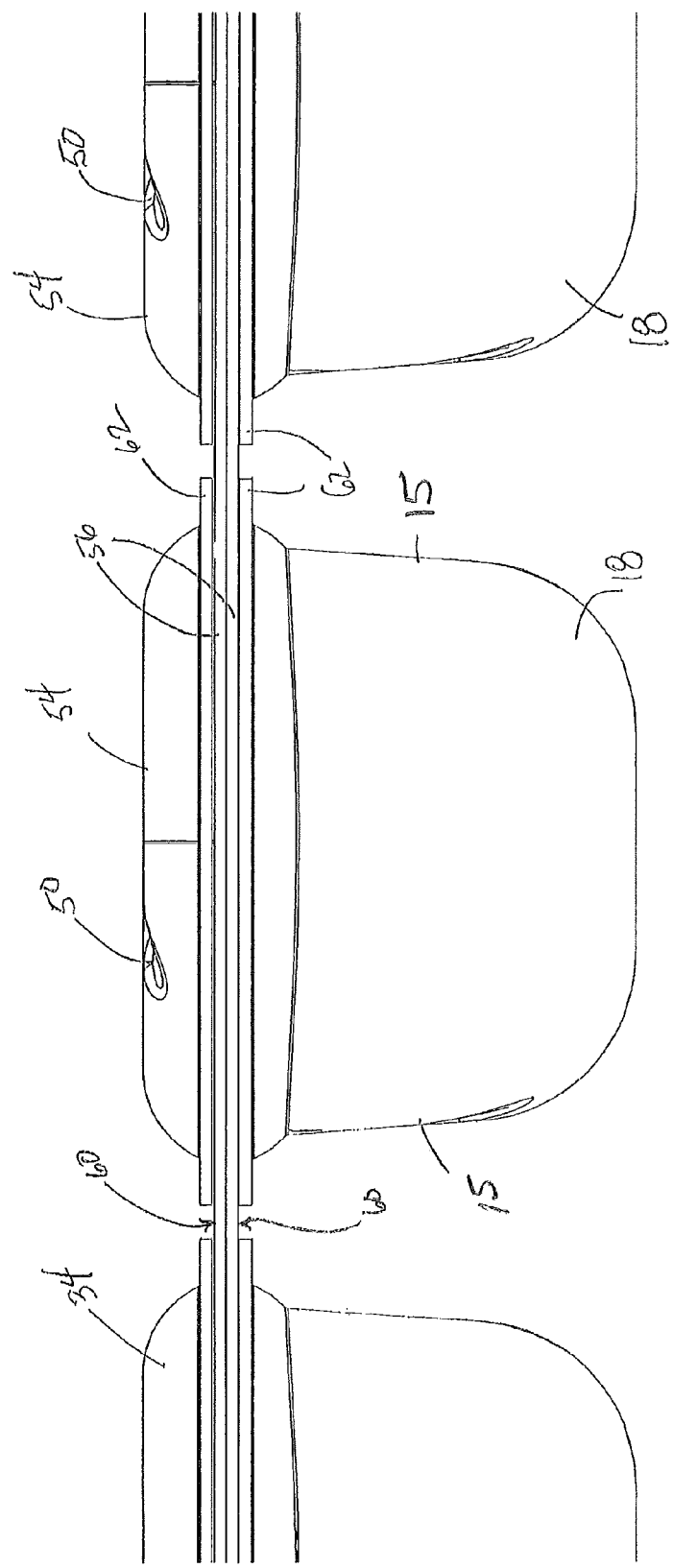
FIG. 25 is an enlarged front plan view of the embodiment shown in FIG. 20, further illustrating the top nested in the base.
Figure 26:
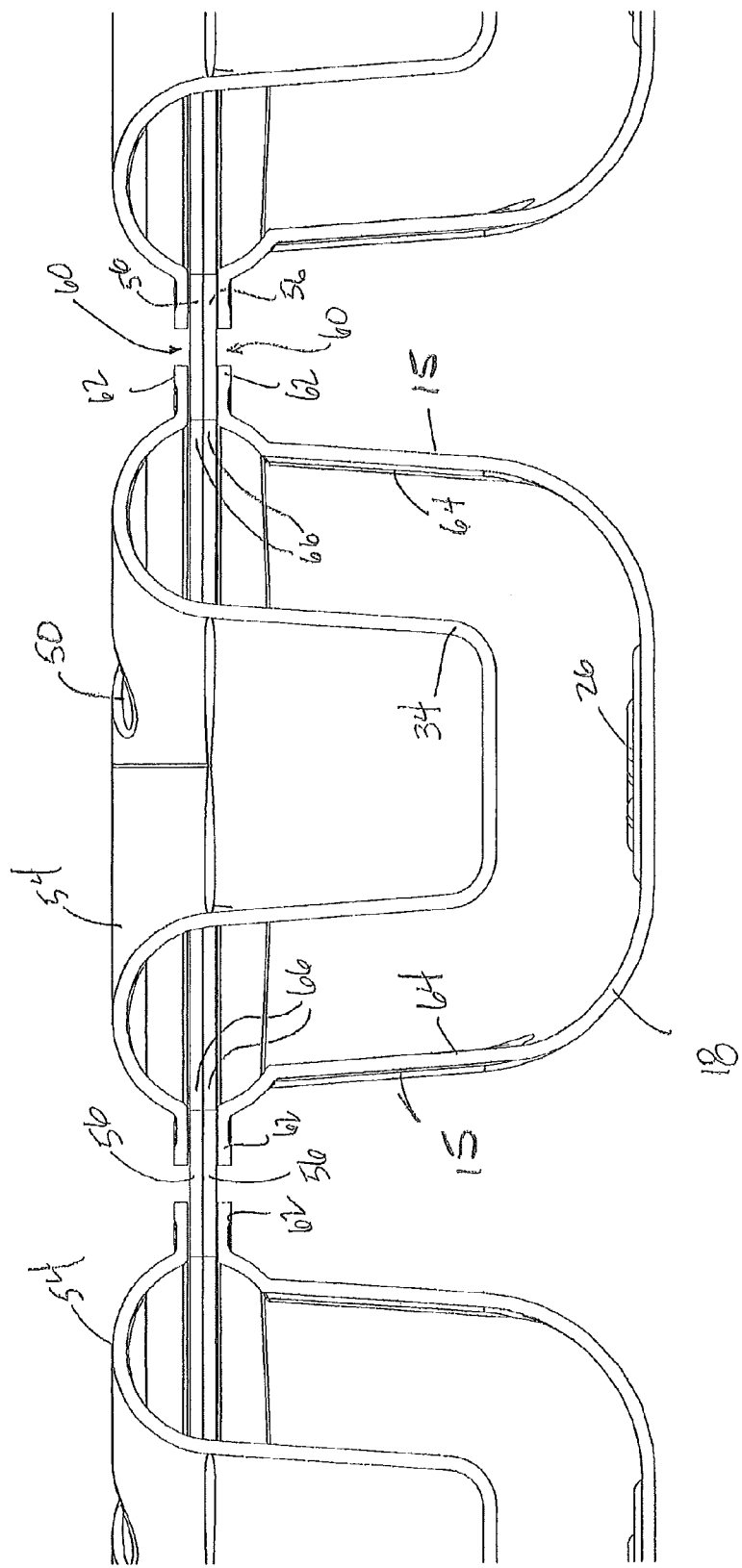
FIG. 26 is a cross-sectional view of the baking pan of FIG. 25.
Figure 27:
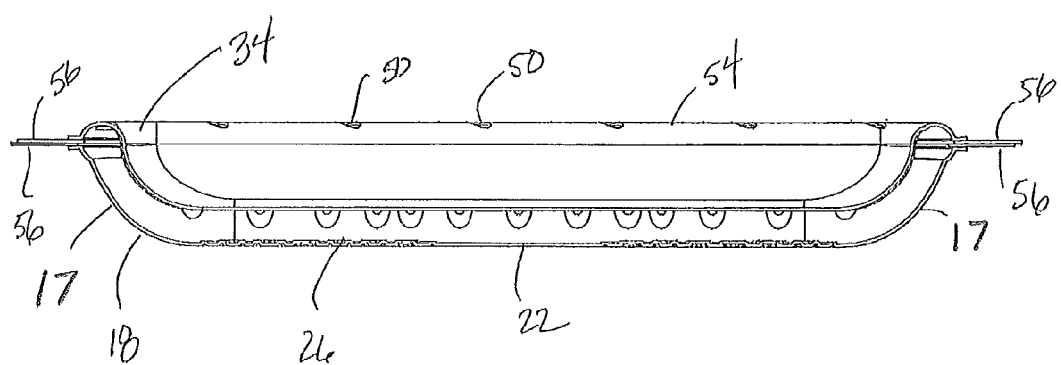
FIG. 27 is a cross-section view of the baking pan of FIG. 25, taken along a plane perpendicular to that of FIG. 26.
Figure 28:
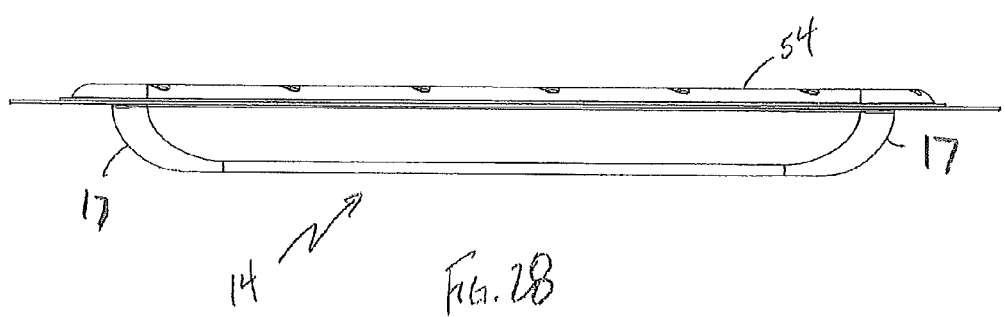
FIG. 28 is a side elevation view of the top of the baking pan illustrated in FIG. 20.
Figure 29:
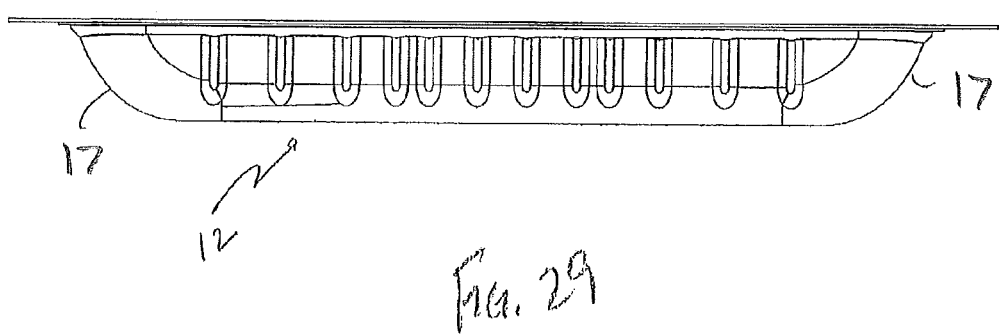
FIG. 29 is a side elevation view of the base of the baking pan illustrated in FIG. 20.

FIGS. 20-29 illustrate a further embodiment of the present invention. As shown, ten cavities 18 and ten molds 34, of the type illustrated in FIGS. 18 and 19, are joined to form a single base 12 and top 14. As shown in FIGS. 23 and 24, a carrier 56 is used to join the individual cavities 18 and molds 34. The carrier 56 includes a cut-out 58 for each of the individual cavities and molds. The surface 70 of the carrier 56 surrounding each cut-out supports the perimeter edge 62 of the cavities 18 and molds 34. The cavities 18 and molds 34 are placed in the cut-outs 58 and the component pieces are soldered together. As illustrated in FIG. 25, a gap 60 may be formed between adjacent cavities and molds to accommodate a solder bead. The edges 62 of the individual cavities and molds may be straight, as shown in FIGS. 18-19, or the edges 62 may be serrated or scalloped to facilitate solder bonding of the component pieces together. As best illustrated in FIG. 26, when the top 14 and base 12 are nested, the inner edges 66 of the cut-outs 58 form part of the inner surface 64 of the cavity. During baking, the dough abuts the inner surface 64, including the inner edges 66. Any portion or all of the surface 64, including the inner edges 66, may be texturized or formed to alter the surface aesthetics of the final bun product.

Figure 7:
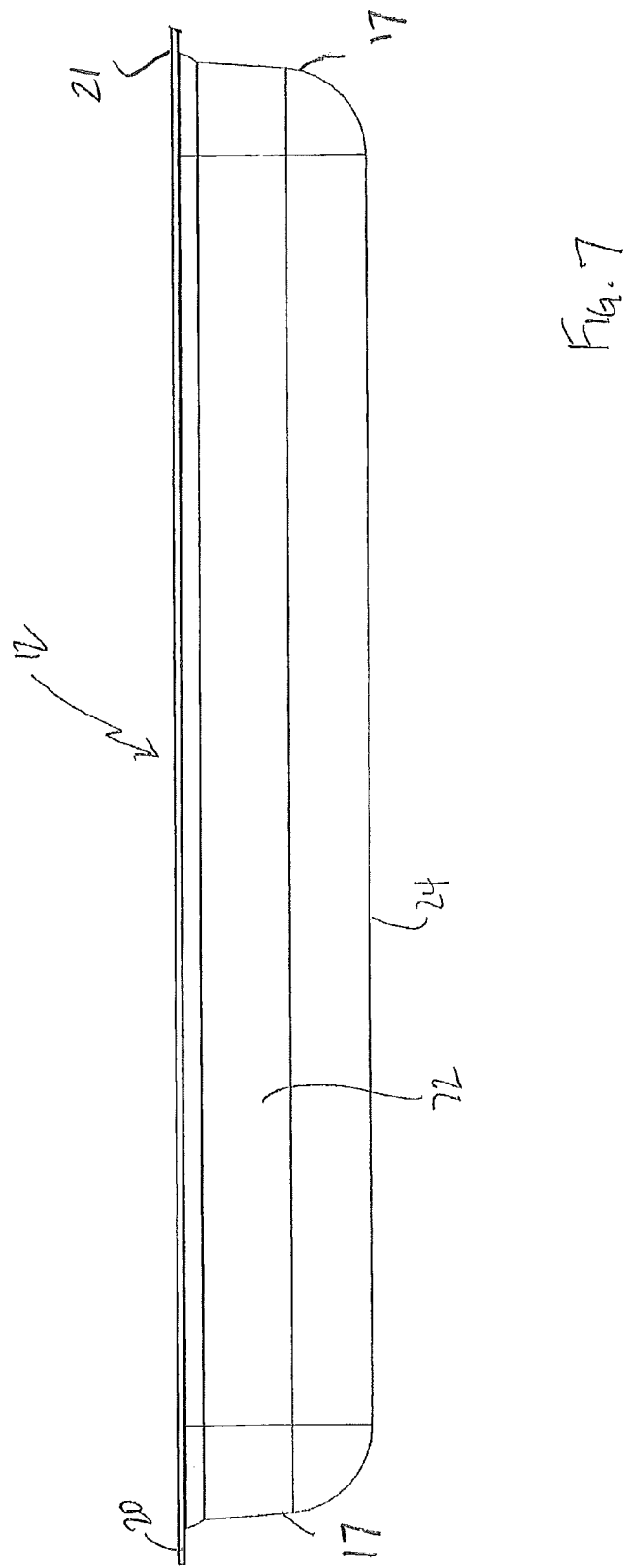
FIG. 7 is a side elevation view of the base of the baking pan shown in FIG. 2.

Another feature of the baking pan of FIGS. 20-29 is that the end walls 17 are less vertical and slope more gradually than the end walls 17 of FIGS. 7 and 10. Applicant believes a more gradual slope will allow the dough to rise more completely and fully, thereby facilitating the quality of the final product, increasing yield and reducing waste. In addition, in this embodiment, the side walls 15 of the cavities 18 are less vertical than the side walls 15 of FIG. 5. In a preferred embodiment, the side walls 15 will be tapered outwardly between 3 to 10 degrees, and most preferably 4 to 5 degrees.

It should be appreciated that the frame 16 illustrated in FIGS. 1-4 may be utilized with all embodiments of the baking pan 10, including the baking pans shown in FIGS. 20-29, as well as the individual baking pans shown in FIGS. 18-19. Alternatively, a vertical rack may be constructed to receive multiple baking pans 10. The rack may be placed on rollers and moved in and out of an oven, or it may remain in the oven. Utilizing removable racks will provide faster throughput. In one embodiment, the rack will be three-sided, with a plurality of receiving frames or shelves positioned one above the other. Each receiving frame will include a groove, preferably tapered, to receive the perimeter edges 20 and 32 of a baking pan. Thus, a grooved frame member would be positioned on each side and along the back of the rack. A fourth set of frame members, for securing the front edge of the pans, may be connected to the rack in the form of a pivoting door which may be closed once the rack is filled with pans, or a set of front edge frame members may be affixed to the oven door, such that when the oven door 4 closes, the frame engages the front edge of the pans. Further still, the rack may be two-sided and the frame members engage only opposed side edges of the baking pans. In this manner, the baking pans may be loaded or unloaded from opposite sides of the rack.

Figure 30:
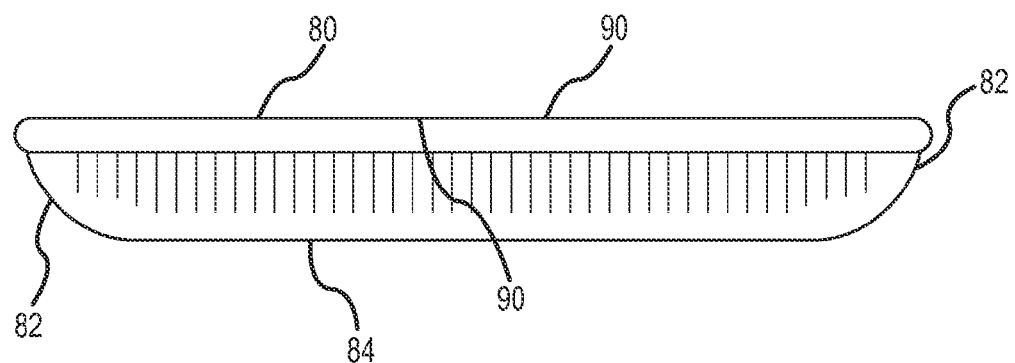
FIG. 30 is a side elevation of one embodiment of a bun made according to the inventions described herein, further showing two closed ends.
Figure 31:
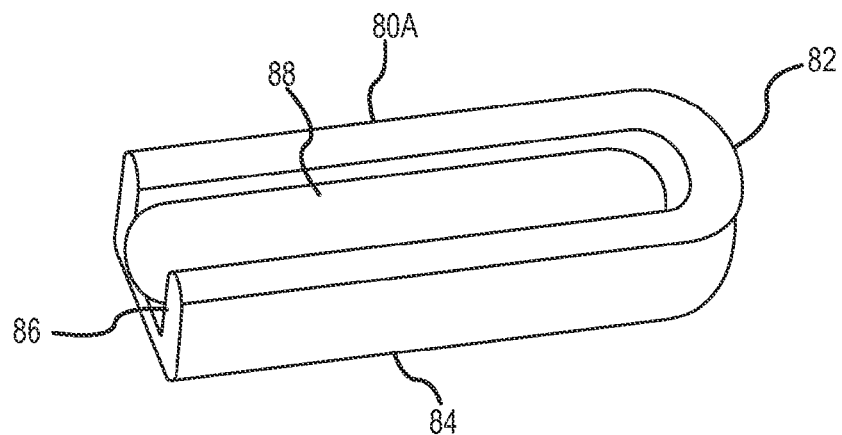
FIG. 31 is a perspective view of one embodiment of a bun made according to the inventions described herein, further showing one open end, one closed end and a hot dog positioned in the bun.
Figure 32:
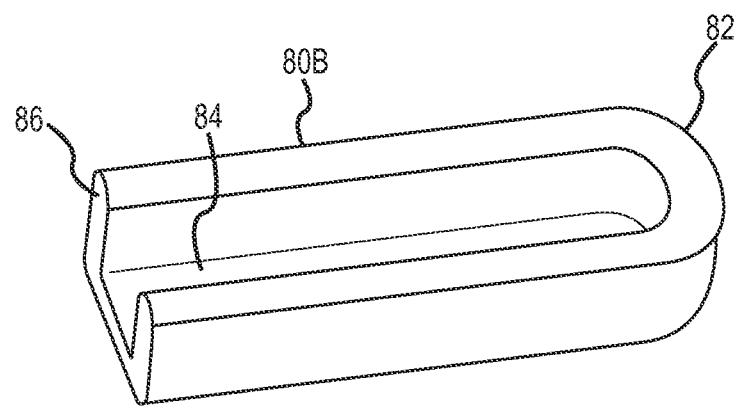
FIG. 32 is a perspective view of the bun of FIG. 32, with the hot dog removed.
Figure 33:
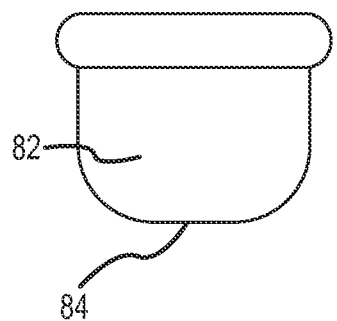
FIG. 33 is an end view of the bun of FIG. 32.

FIG. 30 illustrates one embodiment of a bun 80 produced by a baking pan made according to embodiments of the present invention. The bun has two closed ends 82 and a flat bottom 84. FIGS. 31 and 32 illustrate another embodiment of a bun produced by a baking pan according to embodiments of the present invention. As shown, the bun 80 of FIG. 30 has been cut to produce two smaller buns 80A (FIGS. 31)

and 80B (FIG. 32). Buns 80A and 80B have one closed end 82 and one open end 86. In addition, a hot dog 88 is shown in FIG. 31. An end view of a closed end of a bun is shown in FIG. 33. Also, as shown in FIG. 30, the indentations 50 formed in a baking pan can form markings 90 in the produced bun 80, for example, similar to an oven rack used in baking While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. For example, the baking pan designed in accordance with the embodiments of the present invention will produce individual buns that do not require separation once baked. The resulting buns can be cut to any length, preferably up to 11½", or in one embodiment can be used as a 12" four-sided bun. This allows for a more versatile product as the user may determine bun length as required. Further, the baking pan in one embodiment forms a one piece, U-shaped, flat bottomed bun with rounded corners leading to a flat end at the heal on one end. As a result, the bottoms of the buns will not become loose or fall apart, the shape is more easily held than traditional buns because they fit better in one's hand, the flat base allows the bun with its contents to be placed on a plate without rolling to its side, spilling its contents and the heal at one end helps to prevent the spilling of its contents even if the back of the bun is tilted down slightly while being consumed. Further still, the baking pans form resulting buns with decorative features that, in one embodiment, emulate French bread loaves. The sides are slightly angled outward and have a ribbed motif and the tops have a rounded finish that displays a decorative indentation that resembles a split-top loaf of bread. The flat bases of the buns may also be imprinted with a grid pattern and/or incorporate the NUBUNS™ trademark or logo. The resulting buns are attractive and appetizing, the rounded top also facilitates the retention of any condiments or toppings, the ribbed sides provide a more secure grip on the bun, and the NUBUNS™ trademark or logo on the bottom or inside surface of the bun identifies the bun as an authentic NUBUNS™ product. The present invention also includes within its scope the application of a non-stick surface, such as Teflon™, on the inner surface of each cavity 18 and the outer surface of each mold 34.

As can be appreciated by one of skill in the art, an appropriate measure of dough is placed in each of the cavities of the base, the cover is positioned over and nested within the base and the frame member is secured around the perimeter edge of the cover and base to join the perimeter edges together. As should further be appreciated by those of skill in the art, the type and quantity of dough can vary depending upon the desired end product. Similarly, recipes for baking the dough into a finished bun may change. For example, varying amounts of time may be utilized to allow the dough to rise prior to placing the assembled baking pan into an oven.

Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A baking pan apparatus, comprising:
   a. a base pan having a substantially first planar body, the first body defining a perimeter edge, a plurality of cavities extending from the first body and the first body having first flat portions surrounding the plurality of cavities, each of the plurality of cavities comprising a pair of spaced apart end walls, a pair of spaced apart side walls, and a first flat bottom portion, wherein the end walls and the side walls form a sloped surface between the first flat portions of the first body and the first flat bottom portion of the cavity;
   b. a top pan having a substantially second planar body, the second body defining a perimeter edge, a plurality of molds extending from the second body and the second body having second flat portions surrounding the plurality of molds, each of the plurality of molds comprising a pair of spaced apart end walls, a pair of spaced apart side walls, and a second flat bottom portion, wherein the end walls and the side walls form a sloped surface between the second flat portions of the second body and the second flat bottom portion;
   c. wherein, the top pan is adapted to nest with the bottom pan such that a single mold nests within a single cavity and a space is formed between each mold and each cavity;
   d. wherein each mold further comprises a curved upper portion extending around the perimeter of each mold between the side walls and end walls of the mold and the second flat portions of the mold; and
   e. a frame assembly adapted to engage the perimeter edge of the base pan and the perimeter edge of the top pan and secure the position of the top pan relative to the position of the base pan.

2. The baking pan apparatus of claim 1, wherein the end walls, side walls and first flat bottom surface of each of the plurality of cavities forms an inner surface of each cavity and the end walls, side walls and second flat bottom surface of each of the plurality of molds forms an outer surface of each mold, further comprising at least one aesthetic feature formed on the inner surface of each cavity to form an aesthetic appearance on the outside surface of a baked product.

3. The baking pan apparatus of claim 2, further comprising at least one aesthetic feature formed on the outer surface of each mold to form an aesthetic appearance on an inside surface of a baked product.

4. The baking apparatus of claim 1, wherein the spaced apart side walls of the cavities slope outwardly from a plane perpendicular to the first flat bottom portion between 3 and 10 degrees.

5. The baking pan apparatus of claim 2, wherein the at least one aesthetic feature comprises at least one of an indentation or a protrusion.

6. The baking apparatus of claim 2, wherein the at least one aesthetic feature comprises a trademark formed on the flat bottom portion of each cavity.

7. The baking apparatus of claim 1, wherein the frame assembly comprises means for engaging and securing the top pan relative to the base pan.

8. The baking apparatus of claim 7, wherein the means for engaging comprises four frame members each having a channel formed therein to receive a perimeter edge of the top pan and base pan.

9. The baking apparatus of claim 8, wherein the channels are tapered in cross-section.

10. A baking pan apparatus, comprising:
   a. a first substantially planar carrier, the carrier defining a perimeter edge and having a plurality of apertures formed therein;
   b. a second substantially planar carrier, the carrier defining a perimeter edge and having a plurality of apertures formed therein;
   c. a plurality of base pans, each base pan having a perimeter edge, a cavity and a first flat portion between the cavity and the perimeter edge, the perimeter edge defining an area larger than an aperture in the first carrier, the cavity having an inner surface and an outer surface;
   d. a plurality of top pans, each top pan defining a perimeter edge, a mold, and a second flat portion between the mold and the perimeter edge, the mold having an inner surface and an outer surface;
   e. wherein, a base pan is adapted to fit in a single aperture in the first carrier and a top pan is adapted to fit in a single aperture in the second carrier, and wherein each top pan is adapted to nest within a base pan to form a space between the outer surface of each mold and the inner surface of each cavity; and
   f. a frame assembly adapted to engage the first and second carriers to secure the position of the first carrier relative to the position of the second carrier.

11. The baking apparatus of claim 10, further comprising at least one aesthetic feature formed on the inner surface of each cavity to form an aesthetic appearance on the outside surface of a baked product made using the baking apparatus.

12. The baking pan apparatus of claim 11, further comprising at least one aesthetic feature formed on the outer surface of each mold to form an aesthetic appearance on an inside surface of a baked product made using the baking apparatus.

13. The baking apparatus of claim 10, wherein the inner surface of the cavities have a slope between 3 and 10 degrees.

14. The baking apparatus of claim 11, wherein the at least one aesthetic feature comprises at least one of an indentation or a protrusion to provide the aesthetic appearance on the surface of a baked product made using the baking apparatus was baked on an oven rack.

* * * * *